(12) United States Patent
Bessho et al.

(10) Patent No.: US 6,243,670 B1
(45) Date of Patent: Jun. 5, 2001

(54) METHOD, APPARATUS, AND COMPUTER READABLE MEDIUM FOR PERFORMING SEMANTIC ANALYSIS AND GENERATING A SEMANTIC STRUCTURE HAVING LINKED FRAMES

(75) Inventors: Katsuji Bessho, Yokosuka; Shigehito Iwase, Yokohama, both of (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 09/386,996

(22) Filed: Aug. 31, 1999

(30) Foreign Application Priority Data

Sep. 2, 1998 (JP) .................................... 10-248814

(51) Int. Cl.[7] ............................. G06F 17/27; G06F 17/30
(52) U.S. Cl. ..................................... 704/9; 707/4
(58) Field of Search ........................ 704/9, 1, 10; 707/2, 707/3, 4, 5, 6, 7, 104, 531, 532, 533

(56) References Cited

U.S. PATENT DOCUMENTS

| 5,737,617 | * | 4/1998 | Bernth et al. ........................... | 704/1 |
| 5,933,822 | * | 8/1999 | Braden-Harder et al. ............... | 707/5 |
| 5,966,686 | * | 10/1999 | Heidorn et al. ......................... | 704/9 |
| 5,995,922 | * | 11/1999 | Penteroudakis et al. ................ | 704/9 |
| 6,076,051 | * | 6/2000 | Messerly et al. ....................... | 704/9 |
| 6,112,168 | * | 8/2000 | Corston et al. ......................... | 704/9 |

OTHER PUBLICATIONS

IBM Technical Disclosure Bulletin, vol. 33, issue No. 3B, pp. 334–336, "Resolution of Word–Sense Ambiguity by Example Sentences" Aug. 1990.*

Vaughan R. Pratt, "A Linguistics Oriented Programming Language," 1973.

Vaughan R. Pratt, "Lingol—A Progress Report," 1975.

Shun Ishizaki, Hitoshi Isahara, Ken–ichi Handa "Natural Language Processing System with Deductive Learning Mechanism," 1987.

Shun Ishizaki, Takashi Ikeda, Yoshiyuki Sakamoto, Shouichi Yokoyama, Hitoshi Isahara "Conceptual Dictionary as Interlingua," 1990.

* cited by examiner

Primary Examiner—Joseph Thomas
(74) Attorney, Agent, or Firm—Kenyon & Kenyon

(57) ABSTRACT

A method for performing a semantic analysis process on a computer system including a storage unit and an interface includes the steps of: receiving a syntactic tree generated from a natural language sentence text; determining whether an analysis object, which is one of nodes of the syntactic tree, is a verb phrase class which has a verb as a head or a non-verb phrase class which has mainly a noun as the head on the basis of subdivided type information of a phrase of the node with reference to first data stored in the storage unit; analyzing a relation between a verb in the analysis object and a deep case of the verb when the analysis object is the verb phrase class; analyzing a modificative relation in the analysis object when the analysis object is the non-verb phrase class; generating a semantic structure of the natural language sentence text wherein the semantic structure comprises semantic frames corresponding to nodes of the syntactic tree, at least two semantic frames of the semantic frames being linked by a head relation or a deep case relation or a modificative relation, and storing the semantic structure in the storage unit or displaying the semantic structure on a display which is connectable to the computer system via the interface.

27 Claims, 23 Drawing Sheets

SEMANTIC STRUCTURE

| TYPE OF PHRASE | SYMBOL |
|---|---|
| SENTENCE | S |
| NOUN PHRASE | N P |
| VERB PHRASE | V P |
| ADJECTIVE PHRASE | A D J P |
| ADVERB PHRASE | A D V P |

| TYPE OF PART OF SPEECH | SYMBOL |
|---|---|
| NOUN | N |
| PRONOUN | P N |
| VERB | V |
| ADJECTIVE | A D J |
| ADVERB | A D V |
| ARTICLE | D E T |
| PREPOSITION | P R E P |

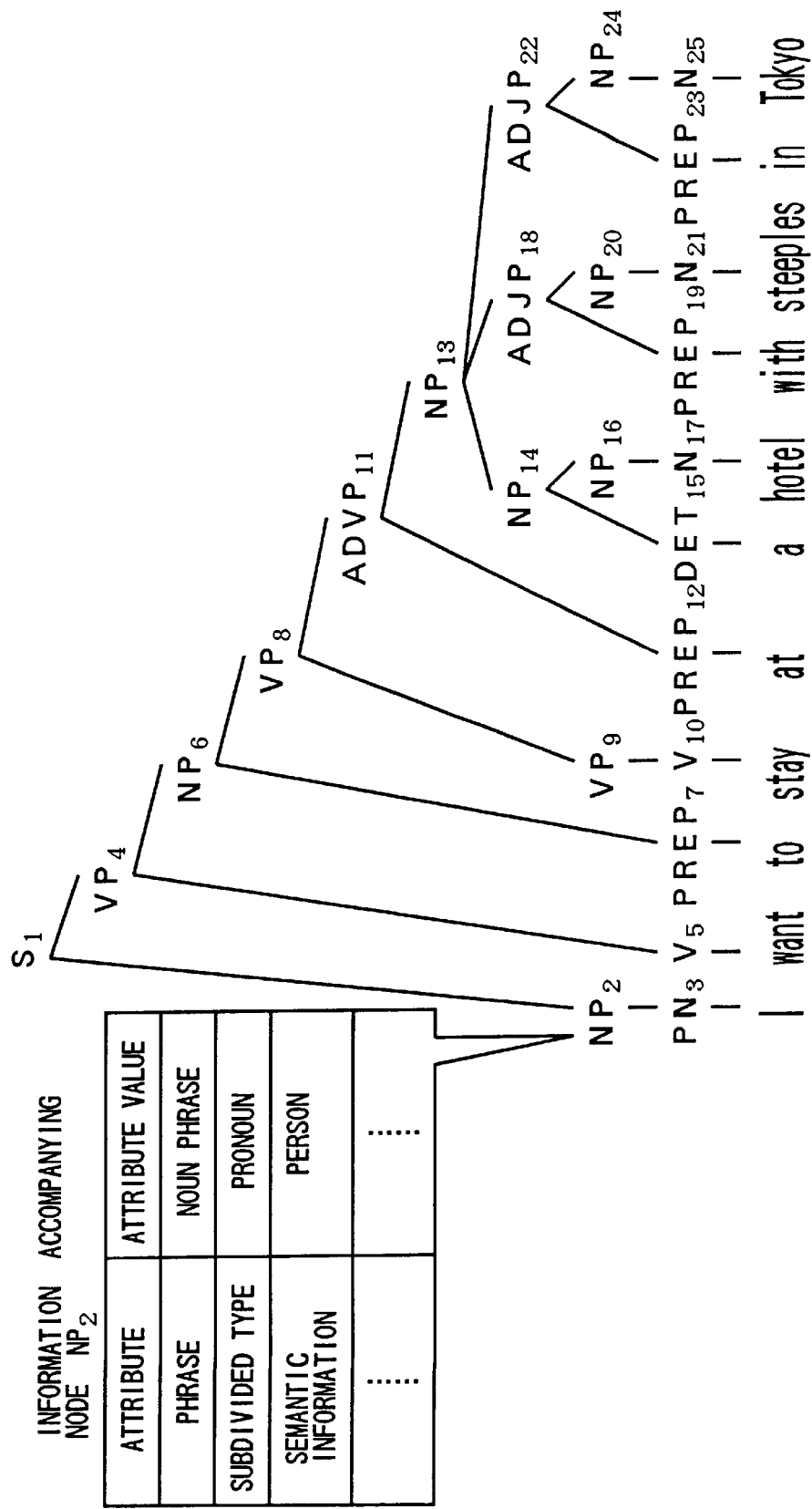

FIG. 12

| PHRASE | VERB PHRASE CLASS | NON-VERB PHRASE CLASS |
|---|---|---|
| SENTENCE (S) | SUBDIVIDED TYPE: INCLUDING VP DIRECTLY BELOW | SUBDIVIDED TYPE: NOT INCLUDING VP DIRECTLY BELOW |
| NOUN PHRASE (NP) | SUBDIVIDED TYPE: INFINITIVE PHRASE<br>SUBDIVIDED TYPE: GERUND PHRASE | SUBDIVIDED TYPE: GENERAL<br>SUBDIVIDED TYPE: PRONOUN |
| ADJECTIVE PHRASE (ADJP) | SUBDIVIDED TYPE: INFINITIVE PHRASE<br>SUBDIVIDED TYPE: PRESENT PARTICIPLE PHRASE<br>SUBDIVIDED TYPE: PASSIVE PARTICIPLE PHRASE | SUBDIVIDED TYPE: GENERAL |
| ADVERB PHRASE (ADVP) | SUBDIVIDED TYPE: INFINITIVE PHRASE | SUBDIVIDED TYPE: GENERAL |

FIG. 14A

| DEEP CASE | SURFACE CASE | | CONSTRAINT CONDITION |
|---|---|---|---|
| | ACTIVE VOICE | PASSIVE VOICE | |
| AGENTIVE CASE | NOMINATIVE CASE | ACCUSATIVE CASE OF "by" | NOUN PHRASE, SEMANTIC INFORMATION : MAN |
| OBJECTIVE CASE | ACCUSATIVE CASE | NOMINATIVE CASE | NOUN PHRASE, SEMANTIC INFORMATION : MATTER |

SEMANTIC INFORMATION OF $V_5$ (want)

FIG. 14B

| DEEP CASE | SURFACE CASE | | CONSTRAINT CONDITION |
|---|---|---|---|
| | ACTIVE VOICE | PASSIVE VOICE | |
| AGENTIVE CASE | NOMINATIVE CASE | ACCUSATIVE CASE OF "by" | NOUN PHRASE, SEMANTIC INFORMATION : MAN |
| LOCATION CASE | ACCUSATIVE CASE OF "at" | ACCUSATIVE CASE OF "at" | NOUN PHRASE, SEMANTIC INFORMATION : OCCUPATION |

SEMANTIC INFORMATION OF $V_{10}$ (stay)

FIG.15A

| TYPE OF PHRASE | SYMBOL |
|---|---|
| SENTENCE | S |
| NOUN PHRASE | NP |
| VERB PHRASE | VP |
| ADJECTIVE PHRASE | ADJP |
| ADVERB PHRASE | ADVP |

FIG.15B

| TYPE OF PART OF SPEECH | SYMBOL |
|---|---|
| NOUN | N |
| PRONOUN | PN |
| VERB | V |
| ADJECTIVE | ADJ |
| ADVERB | ADV |
| ARTICLE | DET |
| PREPOSITION | PREP |
| AUXILIARY | AUX |
| CONJUNCTION | CON |

FIG.19

| PHRASE | VERB PHRASE CLASS | NON-VERB PHRASE CLASS |
|---|---|---|
| SENTENCE (S) | SUBDIVIDED TYPE : SENTENCE<br>SUBDIVIDED TYPE : VERB PHRASE<br>SUBDIVIDED TYPE : INTERROGATIVE SENTENCE<br>SUBDIVIDED TYPE : INTERROGATIVE SENTENCE WITH INTERROGATIVE | SUBDIVIDED TYPE : NOUN PHRASE · CLAUSE |
| NOUN PHRASE (NP) | SUBDIVIDED TYPE : INFINITIVE PHRASE<br>SUBDIVIDED TYPE : GERUND PHRASE | SUBDIVIDED TYPE : GENERAL<br>SUBDIVIDED TYPE : PRONOUN<br>SUBDIVIDED TYPE : INTERROGATIVE PHRASE<br>SUBDIVIDED TYPE : RELATIVE PHRASE |
| ADJECTIVE PHRASE (ADJP) | SUBDIVIDED TYPE : INFINITIVE PHRASE<br>SUBDIVIDED TYPE : PRESENT PARTICIPLE PHRASE<br>SUBDIVIDED TYPE : PASSIVE PARTICIPLE PHRASE | SUBDIVIDED TYPE : GENERAL |
| ADVERB PHRASE (ADVP) | SUBDIVIDED TYPE : INFINITIVE PHRASE | SUBDIVIDED TYPE : GENERAL<br>SUBDIVIDED TYPE : RELATIVE WITH INTERROGATIVE |

FIG.20

| ANALYSIS OBJECT | SUBDIVIDED TYPE | HEAD NODE | ACCUSATIVE CASE | NOMINATIVE CASE | ACCUSATIVE CASE OF PREPOSITION | MODIFICATIVE PHRASE |
|---|---|---|---|---|---|---|
| S | INTERROGATIVE SENTENCE WITH INTERROGATIVE | (A) | (B) | (C) | (D) | — |
| NP | INTERROGATIVE PHRASE | (E), (F) | — | — | — | (G) |
| NP | GENERAL | (H) | — | — | — | (I) |
| ⋮ | ⋮ | ⋮ | ⋮ | ⋮ | ⋮ | ⋮ |

FIG.21

| SURFACE CASE | POSITION IN SYNTACTIC TREE | | |
|---|---|---|---|
| MOVED POSITION OF ACCUSATIVE CASE | (A) MOVED ACCUSATIVE CASE — S / (NP) S ⋮ (V) VERB NODE | (B) MOVED ACCUSATIVE CASE — NP / (NP) ADJP ⋮ (V) VERB NODE | ... |
| ... | ... | ... | ... |

FIG.22

| RETRIEVAL KEY | | | SURFACE CASE INFORMATION | |
|---|---|---|---|---|
| DEEP CASE | VOICE | CONDITION | SURFACE CASE | CONSTRAINT CONDITION |
| OBJECTIVE CASE | ACTIVE VOICE | NONE | ACCUSATIVE CASE | NOUN PHRASE,SEMANTIC INFORMATION:THING |
| | PASSIVE VOICE | NONE | NOMINATIVE CASE | NOUN PHRASE,SEMANTIC INFORMATION:THING |
| LOCATION CASE | ACTIVE VOICE | NONE | ACCUSATIVE CASE OF "at" | NOUN PHRASE,SEMANTIC INFORMATION:OCCUPATION |
| | PASSIVE VOICE | NONE | ACCUSATIVE CASE OF "at" | NOUN PHRASE,SEMANTIC INFORMATION:OCCUPATION |
| AGENTIVE CASE | ACTIVE VOICE | NONE | NOMINATIVE CASE | NOUN PHRASE,SEMANTIC INFORMATION:MAN |
| | PASSIVE VOICE | NONE | ACCUSATIVE CASE OF "by" | NOUN PHRASE,SEMANTIC INFORMATION:MAN |

| RETRIEVAL KEY | | | MOVED SURFACE CASE INFORMATION | |
|---|---|---|---|---|
| DEEP CASE | VOICE | CONDITION | MOVED SURFACE CASE | CONSTRAINT CONDITION |
| OBJECTIVE CASE | ACTIVE VOICE | NO ACCUSATIVE CASE | MOVED ACCUSATIVE CASE | NOUN PHRASE,SEMANTIC INFORMATION:THING |
| | PASSIVE VOICE | NO NOMINATIVE CASE | MOVED NOMINATIVE CASE | NOUN PHRASE,SEMANTIC INFORMATION:THING |
| LOCATION CASE | ACTIVE VOICE | NONE | MOVED ACCUSATIVE CASE OF "at" | NOUN PHRASE,SEMANTIC INFORMATION:OCCUPATION |
| | PASSIVE VOICE | NONE | MOVED ACCUSATIVE CASE OF "at" | NOUN PHRASE,SEMANTIC INFORMATION:OCCUPATION |
| AGENTIVE CASE | ACTIVE VOICE | NOMINATIVE CASE NONE | MOVED NOMINATIVE CASE | NOUN PHRASE,SEMANTIC INFORMATION:MAN |
| | PASSIVE VOICE | NONE | MOVED ACCUSATIVE CASE OF "by" | NOUN PHRASE,SEMANTIC INFORMATION:MAN |

METHOD, APPARATUS, AND COMPUTER READABLE MEDIUM FOR PERFORMING SEMANTIC ANALYSIS AND GENERATING A SEMANTIC STRUCTURE HAVING LINKED FRAMES

BACKGROUND OF THE INVENTION

1. Field of the Invention

The present invention generally relates to a semantic analysis method, a semantic analysis apparatus and a computer readable medium storing a semantic analysis program, and, more particularly, to the method, the apparatus and the computer readable medium in an information searching system used for an information providing service. The information searching system receives an inquiry information of a natural language sentence from a user, and carries out morphological analysis, syntax analysis and semantic analysis. As a result, a semantic structure is obtained. Then, the system extracts keywords as searching keys from the semantic structure, and infers a category name corresponding to the natural language sentence by using the keywords, and outputs a set of searching objects which belong to the category name.

2. Description of the Related Art

As a conventional example of the semantic analysis method, enhanced LINGOL has been proposed. The enhanced LINGOL generates the semantic structure by going back along the syntactic tree from a part of a speech node of the syntactic tree to a sentence (S) node which is a top node in a bottom-up manner.

The enhanced LINGOL includes semantic processing functions in each grammar rule which is used for syntax analysis. After the syntax analysis, the semantic processing functions are activated so as to carry out the semantic analysis. Shun Ishizaki, "Natural language processing", Shoukoudou, can be referred to for more information on this method.

However, in the information searching system which extracts keywords as searching keys from the semantic structure, each of the keywords to be extracted is a specific deep case of a verb in many cases. For example, the keywords to be extracted from an inquiry sentence, "I want to buy flowers in Tokyo", are a verb "buy", a commodity "flowers" and an address "Tokyo", the verb "buy" being the head of an infinitive phrase "to buy flowers in Tokyo" which is the objective case of a verb "want" which is the head of the sentence, the commodity "flowers" being the objective case of the verb "buy", and the address "Tokyo" being the location case of the verb "buy".

Thus, since deep cases which are necessary for extracting the keywords are determined in each information providing service session, it is unnecessary for extracting the keywords to obtain a semantic structure of the inside of the other deep cases.

In the conventional bottom-up search method, since semantic analysis of the inside of unnecessary deep cases is carried out, efficiency decreases and the time necessary for the semantic analysis increases.

In addition, in the method in which semantic processing functions are included in each grammar rule, since the semantic processing function needs to be made for each grammar rule, it is difficult to make the semantic processing function while grasping the whole flow of the semantic analysis.

SUMMARY OF THE INVENTION

It is an object of the present invention to provide a semantic analysis method, a semantic analysis apparatus and a computer readable medium storing a semantic analysis program which can reduce the time necessary for the semantic analysis by analyzing only necessary deep case phrases which are specified for keyword extraction so as to circumvent the need to analyze the inside of the unnecessary deep case, and which allow the user to easily understand the flow of the semantic analysis in a visual way such that the user can easily maintain and modify the semantic analysis apparatus.

The present invention can solve the above-mentioned objective by the following features.

According to a first aspect of the present invention, a method for performing a semantic analysis process on a computer system including a storage unit and an interface, includes the steps of:

receiving a syntactic tree generated from a natural language sentence text;

determining whether an analysis object, which is one of nodes of the syntactic tree, is a verb phrase class which has a verb as a head or a non-verb phrase class which has mainly a noun as the head on the basis of subdivided type information of a phrase of the node with reference to first data stored in the storage unit;

analyzing a relation between a verb in the analysis object and a deep case of the verb when the analysis object is the verb phrase class;

analyzing a modificative relation in the analysis object when the analysis object is the non-verb phrase class;

generating a semantic structure of the natural language sentence text wherein the semantic structure comprises semantic frames corresponding to nodes of the syntactic tree, at least two semantic frames of the semantic frames being linked by a head relation or a deep case relation or a modificative relation, and storing the semantic structure in the storage unit or displaying the semantic structure on a display which is connectable to the computer system via the interface.

According to a second aspect of the present invention, a method for searching information which uses the method for performing the semantic analysis process on the computer system including the storage unit and the interface, includes the steps of:

receiving a natural language sentence text via the interface, performing a morphological analysis process and a syntax analysis process of the natural language sentence text and generating a syntactic tree of the natural language sentence text;

performing the semantic analysis process for the syntactic tree and generating a semantic structure of the natural language sentence text;

extracting a keyword representing an intention of a user of the computer system from the semantic structure;

obtaining a category name and address information corresponding to the natural language sentence text from the keyword with reference to at least a knowledge database stored in the storage unit;

obtaining information to be searched with the category name and the address information with reference to an information database stored in the storage unit, the information database including the information which is classified by the category name and the address information, and sending obtained information via the interface to another computer system or displaying the information on a display which is connectable to the computer system.

According to a third aspect of the present invention, an apparatus for performing a semantic analysis process, including a storage unit and an interface, includes:

unit for receiving a syntactic tree generated from a natural language sentence text;

first unit for determining whether an analysis object, which is one of nodes of the syntactic tree, is a verb phrase class which has a verb as a head or a non-verb phrase class which has mainly a noun as the head on the basis of subdivided type information of a phrase of the node with reference to first data stored in the storage unit;

second unit for analyzing a relation between a verb in the analysis object and a deep case of the verb when the analysis object is the verb phrase class;

third unit for analyzing a modificative relation in the analysis object when the analysis object is the non-verb phrase class;

unit for generating a semantic structure of the natural language sentence text wherein the semantic structure comprises semantic frames corresponding to nodes of the syntactic tree, at least two semantic frames of the semantic frames being linked by a head relation or a deep case relation or a modificative relation, and wherein the semantic structure is stored in the storage unit or displayed on a display which is connectable to the apparatus via the interface.

According to a fourth aspect of the present invention, an apparatus for searching information which uses the apparatus for performing the semantic analysis process on the computer system including the storage unit and the interface, includes:

unit for receiving a natural language sentence text via the interface, unit for performing a morphological analysis process and a syntax analysis process for the natural language sentence text and generating a syntactic tree of the natural language sentence text;

unit for performing the semantic analysis process for the syntactic tree and generating a semantic structure of the natural language sentence text;

unit for extracting a keyword representing an intention of a user of the apparatus from the semantic structure;

unit for obtaining a category name and address information corresponding to the natural language sentence text by using the keyword with reference to at least one knowledge database stored in the storage unit;

unit for obtaining information to be searched by using the category name and the address information with reference to an information database stored in the storage unit, the information database including the information which is classified by the category name and the address information, and unit for sending obtained information via the interface to another computer system or displaying the information on the display which is connectable to the apparatus.

According to a fifth aspect of the present invention, a computer readable medium storing program code for causing a computer system which includes a storage unit and an interface to perform a semantic analysis process, includes:

program code means for receiving a syntactic tree generated from a natural language sentence text;

first program code means for determining whether an analysis object, which is one of nodes of the syntactic tree, is a verb phrase class which has a verb as a head or a non-verb phrase class which has mainly a noun as the head on the basis of subdivided type information of a phrase of the node with reference to first data stored in the storage unit;

second program code means for analyzing a relation between a verb in the analysis object and a deep case of the verb when the analysis object is the verb phrase class;

third program code means for analyzing a modificative relation in the analysis object when the analysis object is the non-verb phrase class;

program code means for generating a semantic structure of the natural language sentence text wherein the semantic structure comprises semantic frames corresponding to nodes of the syntactic tree, at least two semantic frames of the semantic frames being linked by a head relation or a deep case relation or a modificative relation, and program code means for storing the semantic structure in the storage unit or displaying the semantic structure on a display which is connectable to the computer system via the interface.

According to a sixth aspect of the present invention, a computer readable medium which includes program code, storing program code for causing a computer system which includes a storage unit and an interface to search information, includes:

program code means for receiving a natural language sentence text via the interface, program code means for performing a morphological analysis process and a syntax analysis process for the natural language sentence text and generating a syntactic tree of the natural language sentence text;

program code means for performing the semantic analysis process for the syntactic tree and generating a semantic structure of the natural language sentence text;

program code means for extracting a keyword representing an intention of a user of the computer system from the semantic structure;

program code means for obtaining a category name and address information corresponding to the natural language sentence text by using the keyword with reference to at least one knowledge database stored in the storage unit;

program code means for obtaining information to be searched by using the category name and the address information with reference to an information database stored in the storage unit, the information database including the information which is classified by the category name and the address information, and program code means for sending obtained information via the interface to another computer system or displaying the information on a display which is connectable to the computer system.

According to the present inventions, the semantic analysis is carried out from the top node which is a sentence node in a syntactic tree to the bottom node which is a part-of-speech node. In the semantic analysis, knowledge which defines positions, in the syntactic tree, of the head of a phrase, the surface case of the head and the modificative phrase of the head is provided for every kind of phrase. When the semantic analysis is carried out in the top-down manner, the knowledge is referred to. Therefore, the semantic processing functions for each grammar rule are not necessary in the present invention.

Thus, since the semantic analysis is carried out from the top down, only necessary deep case phrases, beginning with the head of a sentence, which are specified for the keyword extraction are analyzed. Therefore, the present invention can circumvent the need to analyze the inside of the deep case, which is unnecessary, such that the time necessary for the analysis can be reduced.

In addition, the semantic analysis apparatus according to the present invention has the knowledge of position. Therefore, the semantic analysis apparatus allows the user to easily understand the flow of the semantic analysis in a visual way such that the user can easily maintain and modify the semantic analysis apparatus.

BRIEF DESCRIPTION OF THE DRAWINGS

Other objects, features and advantages of the present invention will become more apparent from the following detailed description when read in conjunction with the accompanying drawings, in which:

FIG. 9 is a diagram showing a syntactic tree of a natural language sentence text according to the first embodiment of the present invention;

FIG. 12 shows an example of classification knowledge of analysis object categories stored in a unit 400 according to the first embodiment of the present invention;

FIGS. 14A–14B show examples of values of semantic information of verb nodes of the syntactic tree according to the first embodiment of the present invention;

FIG. 15A is a diagram for explaining types of phrases and corresponding symbols according to a second embodiment of the present invention;

FIG. 15B is a diagram for explaining types of parts of speech and corresponding symbols according to the second embodiment of the present invention;

FIG. 19 shows an example of the classification knowledge of analysis object categories stored in the unit 400 according to the second embodiment of the present invention;

FIG. 20 shows an example of knowledge of normal positions of the surface case in the knowledge of positions in a syntactic tree according to the second embodiment of the present invention;

FIG. 21 shows an example of knowledge of positions of the moved surface case according to the second embodiment of the present invention;

FIG. 22 shows an example of values of semantic information of verb nodes of the syntactic tree according to the second embodiment of the present invention;

DETAILED DESCRIPTION OF THE PREFERRED EMBODIMENTS

Figure 1:
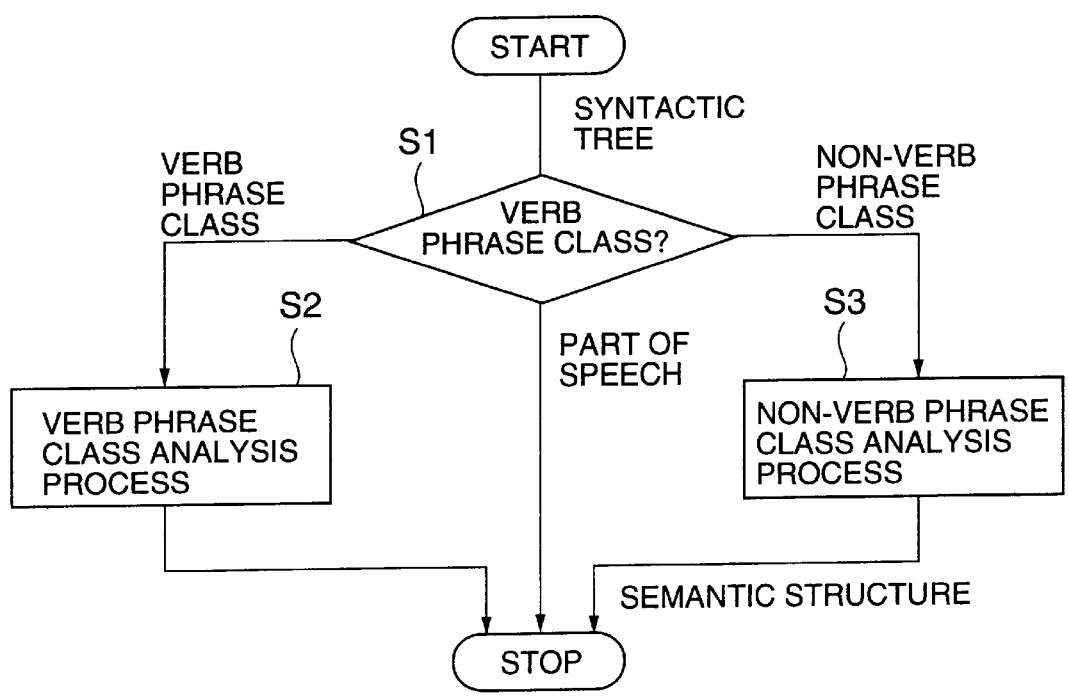
FIG. 1 is a diagram for explaining a principle of a semantic analysis method according to the present invention.

FIG. 1 is a diagram for explaining a principle of the semantic analysis method according to the present invention. As shown in FIG. 1, a process for determining a category of an analysis object is carried out in step 1. Specifically, in step 1, a node which is the analysis object of a syntactic tree is input, and it is determined whether the analysis object is a verb phrase class which has a verb as the head, or a non-verb phrase class which has mainly a noun as the head, or a part of speech. Then, the result of the determination is output.

Next, if the analysis object is the verb phrase class, a verb phrase class analysis process is carried out in step 2. Specifically, in step 2, an analysis object frame corresponding to the analysis object is input, the relation between a verb and a deep case of the verb in the analysis object frame is analyzed, and then a semantic structure in the analysis object frame is output.

If the analysis object is the non-verb phrase class, a non-verb phrase class analysis process is carried out in step 3. Specifically, in step 3, an analysis object frame corresponding to the analysis object is input, the modificative relation, for example, between a noun phrase and an adjective phrase in the analysis object frame is analyzed, and then a semantic structure in the analysis object frame is output. If the analysis object is the part of speech, the semantic analysis ends.

Figure 2:
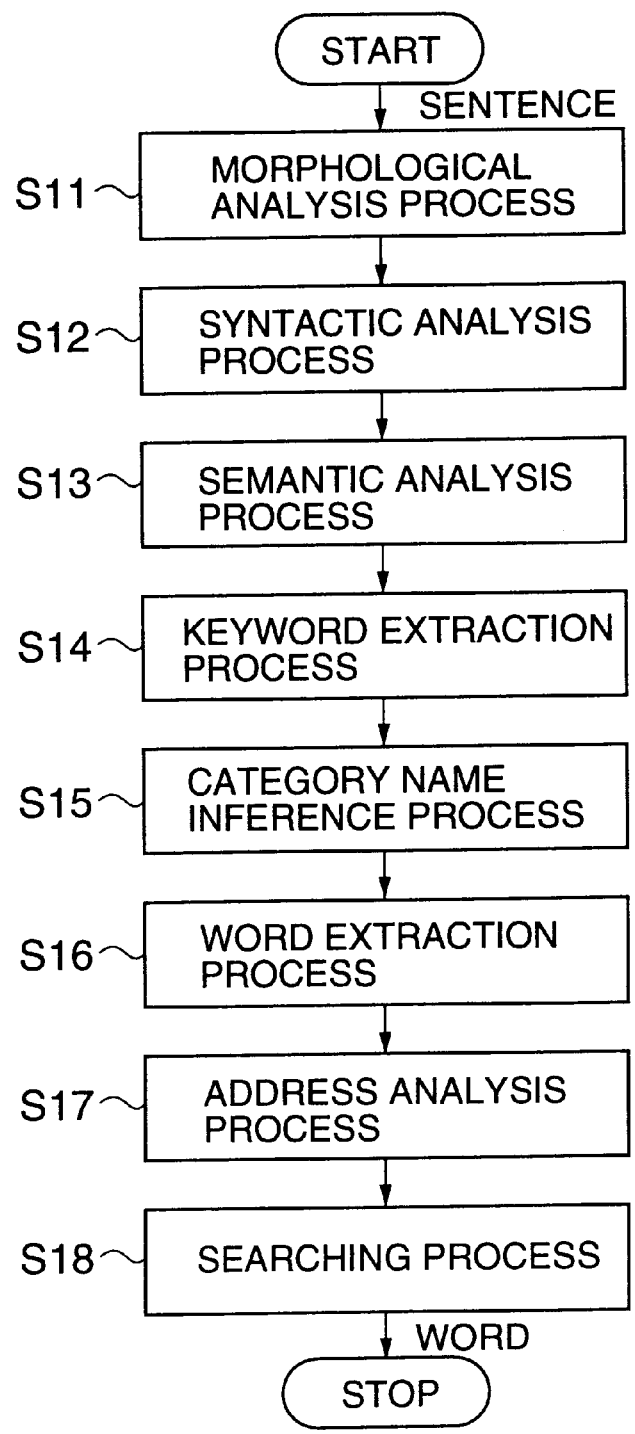
FIG. 2 is a flowchart showing an example of an information searching method according to the present invention.

FIG. 2 is a flowchart showing an example of an information searching method which uses the above-mentioned semantic analysis method.

As shown in FIG. 2, according to the information searching method of a natural language sentence text input type, a morphological analysis process is carried out in step 11. That is, the natural language sentence text is input, and a set of constituent words of the natural language sentence text and attribute information of the words such as "noun" are output. Next, a syntax analysis process is carried out in step 12. That is, the output result of the step 11 is input, and a syntactic tree of the natural language sentence text is output, the syntactic tree having nodes each of which nodes is accompanied by information such as a type of a phrase or a part of speech, a subdivided type of the phrase, semantic information or the like.

Then, the semantic analysis process is carried out in step 13. Specifically, in step 13, the syntactic tree of the natural language sentence text is input, and a semantic structure of the natural language sentence text is output, the semantic structure including semantic frames corresponding to nodes of the syntactic tree and links connecting the frames. Each of the links indicates any one of a head relation, a deep case relation and a modificative relation, the head relation being a relation between a first phrase, and a second phrase or a part of speech which determine most of the syntactic characteristics of the first phrase, the deep case relation being a relation between a verb and a noun phrase or the like which corresponds to an objective case or a location case or the like of the verb, and the modificative relation being a relation between a noun phrase and an adjective phrase, for example, which modifies the noun phrase.

Next, a keyword extraction process is carried out in step 14. That is, the semantic structure of the natural language sentence text is input, and the keywords which indicate the user's intention are extracted from the natural language sentence text, and the keywords are output.

After that, a category name inference process is carried out in step 15, in which the keywords output by the step 14 are input, and the category name of objects to be searched corresponding to the natural language sentence text is output. Then, a word extraction process is carried out in step 16, in which the output result of the step 11 is input, and a word which has attribute information such as a specified part of speech is extracted, and the word is output. Next, an address analysis process is carried out in step 17, in which a keyword which is output by the step 14 and corresponds to an address is input, and address information corresponding to the keyword is output.

Finally, a searching process is carried out in step 18. Specifically, in step 18, the category name output by the step 15 and the address information output by the step 17 are input, and a set of searching objects is output, which set of objects belong to the category name and have the address information. Moreover, higher priority is given to objects which have the word output by the step 16 as a keyword.

Figure 3:
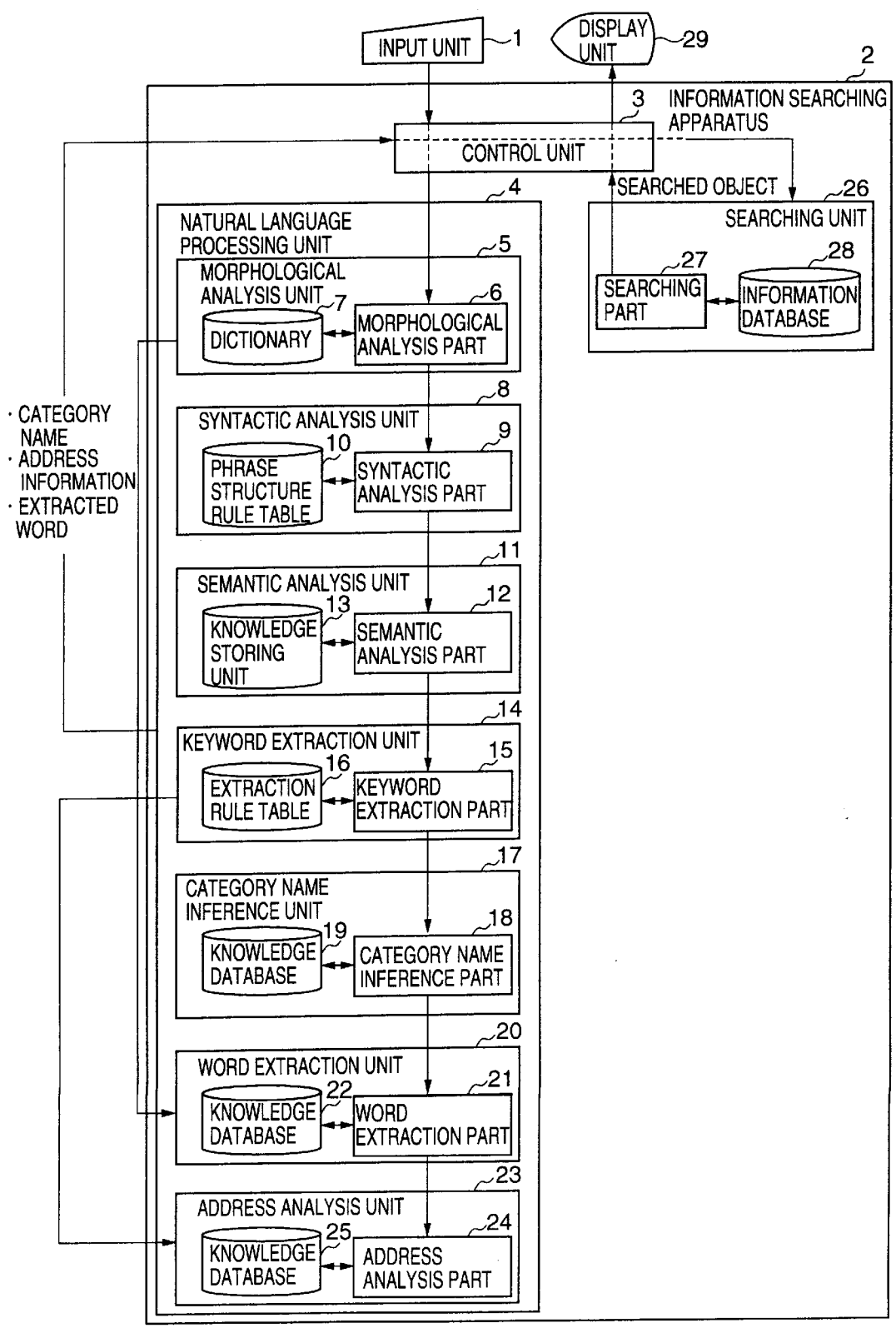
FIG. 3 is a block diagram of an information searching apparatus according to the present invention.

FIG. 3 shows a configuration of an information searching apparatus according to the present invention. The information searching apparatus 2 includes a control unit 3, a natural language processing unit 4, and a searching unit 26.

The control unit 3 receives a natural language sentence text input from an input unit 1 and sends the sentence to the natural language processing unit 4. The natural language processing unit 4 outputs a category name of the searching objects corresponding to the natural language sentence text, address information and extracted words. Next, the control unit 3 receives the category name, the address information and the extracted words. Then, the control unit 3 sends the category name, the address information and the extracted words to the searching unit 26 which outputs a set of searched objects, which are prioritized, corresponding to the category name and the address information. Next, the control unit 3 sends the set of the objects to a display unit 29. In addition, each object to be searched is accompanied with detailed attribute information such that when a specified object is designated from the input unit 1, the control unit 3 may sends the detailed attribute information of the object to the display unit 29.

The natural language processing unit 4 includes a morphological analysis unit 5, a syntactic analysis unit 8, a semantic analysis unit 11, a keyword extraction unit 14, a category name inference unit 17, a word extraction unit 20 and an address analysis unit 23.

The morphological analysis unit 5 receives the natural language sentence text as an input, and the morphological analysis part 6 outputs a set of constituent words of the natural language sentence text and attribute information of the constituent words such as a part of speech with reference to a dictionary 7.

The syntactic analysis unit 8 receives the output of the morphological analysis unit 5, and the syntactic analysis part 9 outputs a syntactic tree of the natural language sentence text, the syntactic tree having nodes each of which nodes is accompanied with information such as a phrase type, a subdivided type of the phrase, semantic information or the like with reference to a phrase structure rule table 10.

The semantic analysis unit 11 receives the syntactic tree of the natural language sentence text, and a semantic analysis part 12 outputs a semantic structure of the natural language sentence text with reference to a knowledge storing unit 13, the semantic structure including semantic frames corresponding to nodes of the syntactic tree and links connecting between the frames. Each of the links indicates any one of a head relation, a deep case relation and a modificative relation, the head relation being relation between a first phrase, and a second phrase or a part of speech which determines most of the syntactic characteristics of the first phrase, the deep case relation being a relation between a verb and a noun phrase or the like which corresponds to an objective case or a location case or the like of the verb, and the modificative relation being a relation between a noun phrase and an adjective phrase, for example, which modifies the noun phrase.

The keyword extraction unit 14 receives the semantic structure of the natural language sentence text, and a keyword extraction part 15 extracts keywords which indicate the user's intention with reference to an extraction rule table 16 and outputs the keywords.

The category name inference unit 17 receives the keywords from the keyword extraction unit 14, and the category name inference part 18 outputs the category name of objects to be searched corresponding to the natural language sentence text with reference to a knowledge database 19 which includes, for example, a thesaurus.

The word extraction unit 20 receives the output of the morphological analysis unit 5, and a word extraction part 21 outputs a word which has attribute information such as a specified part of speech with reference to an extraction object word table 22.

The address analysis unit 23 receives the keyword output by the keyword extraction unit 14, and an address analysis part 24 outputs address information corresponding to the keyword with reference to an address table 25.

The searching unit 26 includes a searching part 27 and an information database 28. The information database 28 classifies a set of objects to be searched into the category name and the address information. Each of the objects to be searched is accompanied by detailed attribute information which includes the keywords of the objects to be searched.

The searching unit 26 receives the category name, the address information and the extracted word from the control unit 3, and the searching part 27 searches a set of objects which have the address information from all objects to be searched which belong to the category name, gives higher priority to the objects which have the extracted word as the keyword, and then outputs the set of objects with reference to the information database 28. In addition, information searching apparatus 2 may include an interface for sending data to another apparatus and receiving data from another apparatus.

Figure 4:
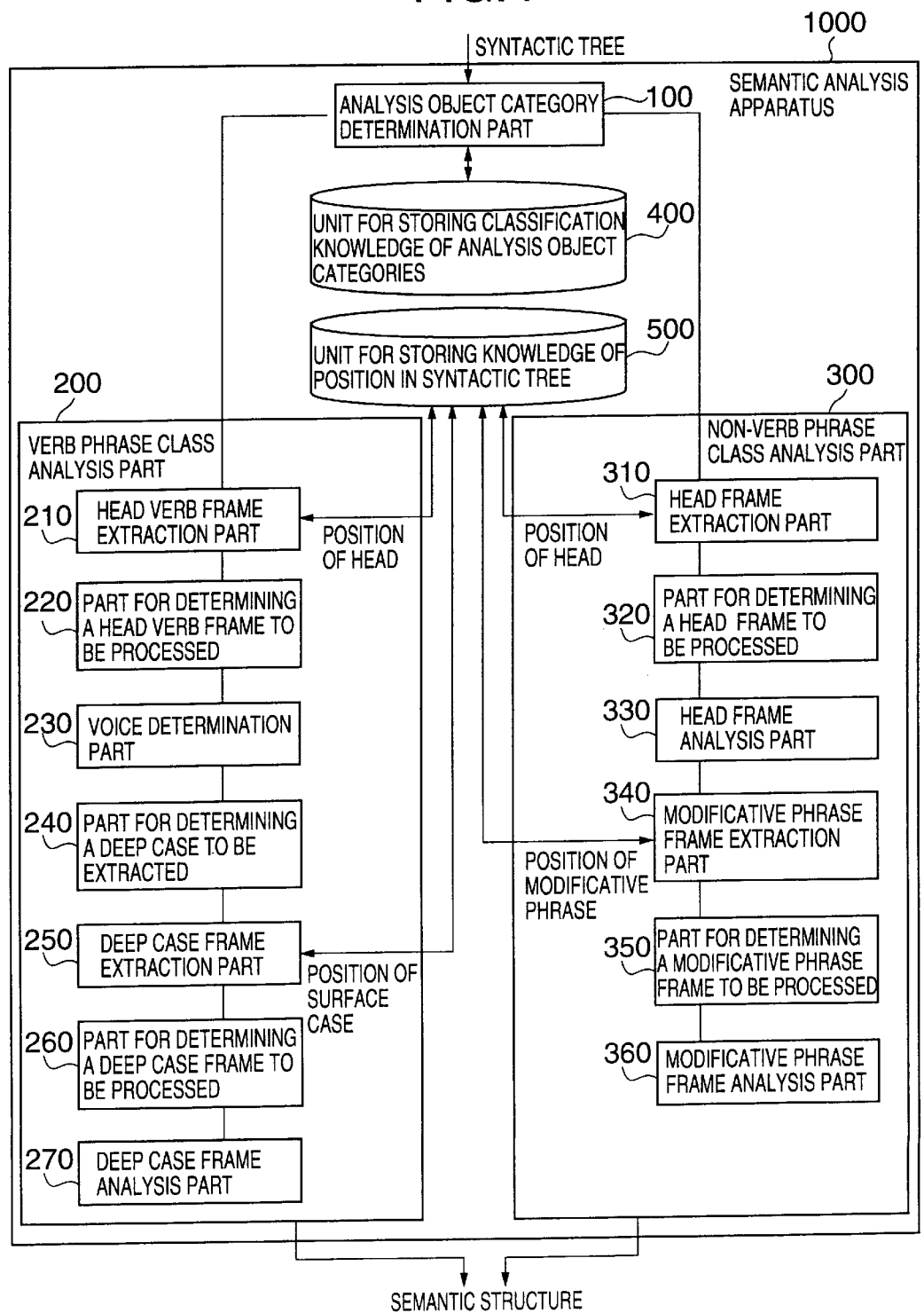
FIG. 4 is a block diagram of a semantic analysis apparatus according to the present invention.

FIG. 4 shows a configuration of a semantic analysis apparatus of the present invention. The semantic analysis apparatus corresponds to the semantic analysis unit 11 in the above-mentioned information searching apparatus 2.

The semantic analysis apparatus 1000 shown in FIG. 4 includes an analysis object category determination part 100, a verb phrase class analysis part 200, a non-verb phrase class analysis part 300, a unit 400 for storing classification knowledge of analysis object categories, and a unit 500 for storing knowledge of positions in a syntactic tree.

In addition, the semantic analysis apparatus 1000 may include a storage unit for storing various data and an interface for sending or receiving data. Also, a display is connectable to the semantic analysis apparatus 1000.

The unit 400 for storing classification knowledge of analysis object categories stores knowledge for classifying the analysis objects into the verb phrase class or the non-verb phrase class or the part of speech for each combination of phrase type and the subdivided type. The unit 500 for storing knowledge of positions in a syntactic tree stores, for each type of the analysis objects, knowledge which defines positions of the head of the analysis object, the surface case concerning the head and a modificative phrase modifying the head in the syntactic tree, and knowledge which defines a position of a moved surface case in the case that there is not a node corresponding to the surface case concerning the head in the input syntactic tree.

The verb phrase analysis part 200 includes a head verb frame extraction part 210, a part 220 for determining a head verb frame to be processed, a voice determination part 230, a part 240 for determining a deep case to be extracted, a deep case frame extraction part 250, a part 260 for determining a deep case frame to be processed and a deep case frame analysis part 270.

The head verb frame extraction part 210 receives an analysis object, and obtains a verb node which is the head of the analysis object with reference to the knowledge of positions in a syntactic tree which is stored in the unit 500. Then, the part 210 establishes a head verb frame corresponding to the verb node and links an analysis object frame corresponding to the analysis object and the head verb frame by the head relation. As a result, the part 210 outputs a part of the semantic structure in the analysis object frame.

The part 220 for determining a head verb frame to be processed receives a plurality of the head verb frames, and determines a head verb frame on which deep case analysis will be performed in a later process, and, then, outputs the determined head verb frame.

The voice determination part 230 receives the analysis object and the head verb node, determines the voice of the analysis object with reference to voice information in a node which includes the analysis object, and then outputs the voice.

The part 240 for determining a deep case to be extracted receives the head verb node, determines a deep case to be extracted from deep cases included in verb semantic information which accompanies the head verb node, and outputs the deep case.

The deep case frame extraction part 250 receives the analysis object, the head verb node, the deep case and the voice, and obtains a syntactic tree node corresponding to the deep case. If the deep case frame has not been established, the part 250 establishes the deep case frame. Then, the part 250 outputs a part of the semantic structure of the analysis object frame by setting a link of the deep case relation from the head verb frame to the deep case frame. The detailed description of the part 250 will be given later.

The part 260 for determining a deep case frame to be processed receives a plurality of the deep case frames which are newly established in the deep case frame extraction part 250. Then, the part 260 determines which deep case frame is analyzed among the deep case frames so as to output the determined deep case frame.

The deep case frame analysis part 270 receives the deep case frame, and outputs the semantic structure in the deep case frame by repeating the semantic analysis process recursively.

The non-verb phrase class analysis part 300 includes a head frame extraction part 310, a part 320 for determining a head frame to be processed, a head frame analysis part 330, a modificative phrase frame extraction part 340, a part 350 for determining a modificative phrase frame to be processed and a modificative phrase frame analysis part 360.

The head frame extraction part 310 receives an analysis object, and obtains a phrase node or a part-of-speech node which is the head of the analysis object with reference to the knowledge of positions in a syntactic tree which is stored in the unit 500. Then, the part 310 establishes a head frame corresponding to the head node and links an analysis object frame corresponding to the analysis object and the head frame by the head relation. As a result, the part 310 outputs a part of a semantic structure in the analysis object frame.

The part 320 for determining a head frame to be processed receives a plurality of the head frames, and determines which head frame will be analyzed in a later process, and, then, outputs the determined head frame.

The head frame analysis part 330 receives the head frame, and outputs the semantic structure in the head frame by repeating the semantic analysis process recursively.

The modificative phrase frame extraction part 340 receives the analysis object and the head node, and obtains a modificative phrase node modifying the head node with reference to the knowledge of position in the syntactic tree. If the modificative phrase frame has not been established, the part 340 establishes the modificative phrase frame. Then, the part 340 outputs a part of the semantic structure in the analysis object frame by linking the head frame and the modificative phrase frame by the modificative relation.

The part 350 for determining a modificative phrase frame to be processed receives a plurality of the modificative phrase frames which are newly established in the modificative phrase frame extraction part 340. Then, the part 350 determines which modificative phrase frame is analyzed among the modificative phrase frames so as to output the determined modificative phrase frame.

The modificative phrase frame analysis part 360 receives the modificative phrase frame, and outputs the semantic structure in the modificative phrase frame by repeating the semantic analysis process recursively.

Figure 5:
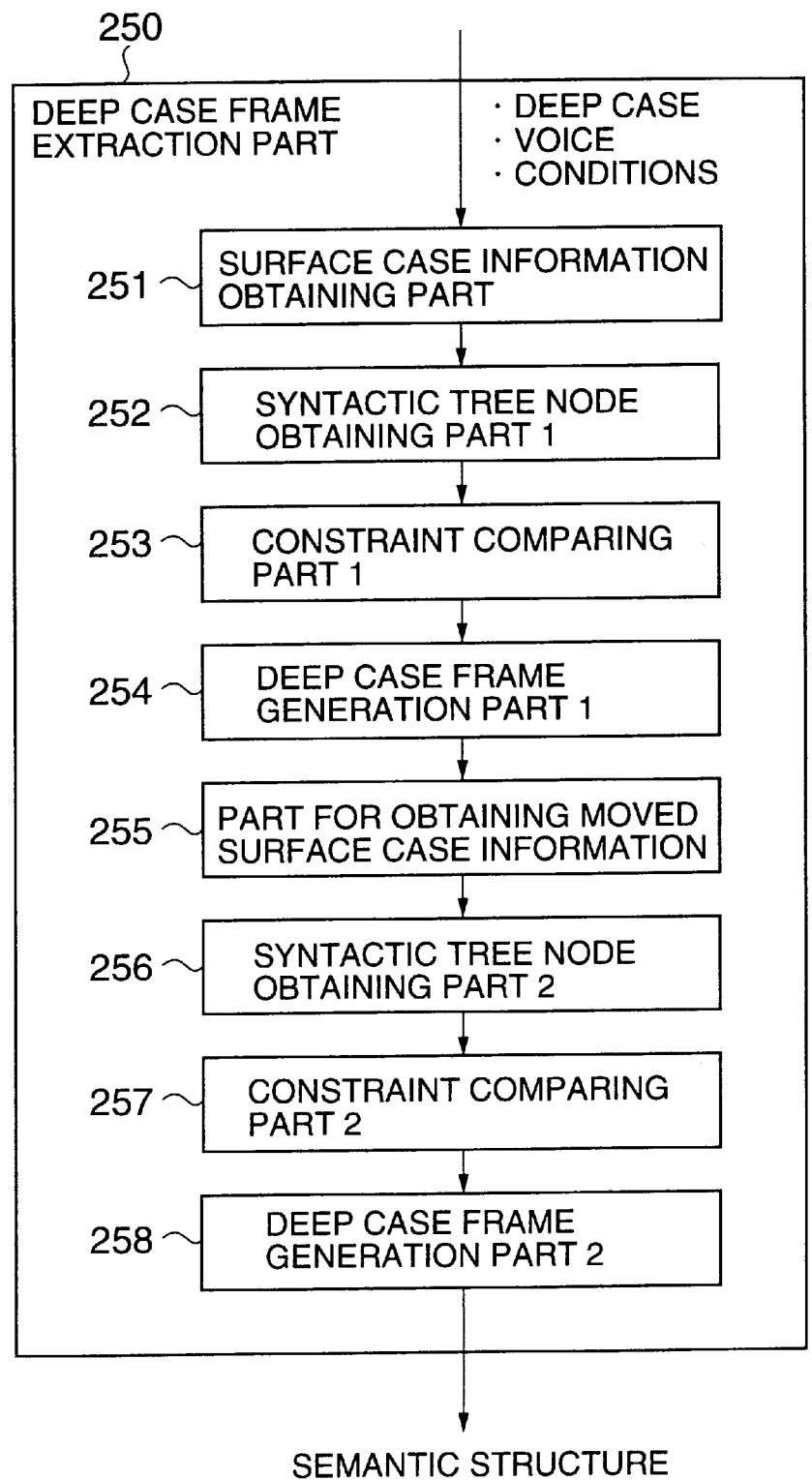
FIG. 5 is a block diagram of a deep-case frame extraction part 250.

FIG. 5 shows a configuration of the deep case frame extraction part 250 which was described before. The deep case frame extraction part 250 includes a surface case information obtaining part 251, a syntactic tree node obtaining part 1 (252), a constraint comparing part 1 (253), a deep case frame generation part 1 (254), a part 255 for obtaining moved surface case information, a syntactic tree node obtaining part 2 (256), a constraint comparing part 2 (257), and a deep case frame generation part 2 (258).

The surface case information obtaining part 251 uses the deep case determined by the part 240, the voice determined by the voice determination part 230 and other conditions such as the presence or absence of a syntactic tree node as searching keys so as to output surface case information. The surface case information includes a set of the surface case and the conditions corresponding to the searching keys, the set being included in verb semantic information which accompanies the head verb node.

The syntactic tree node obtaining part 1 (252) receives a surface case of the surface case information, and outputs a syntactic tree node corresponding to the surface case with reference to the knowledge of positions in a syntactic tree.

The constraint comparing part 1 (253) receives the syntactic tree node and constraints in the surface case information. Then, the part 1 (253) compares information including a type, a subdivided type and semantic information of a phrase or a part of speech which accompanies the syntactic tree node with the constraints, and outputs the result of the comparison.

The deep case frame generation part 1 (254) receives the syntactic tree node in which the result of the process of the constraint comparing part 1 (253) is matching, that is, in which the information is the same as the constraints. Then, the part 1 (254) establishes a deep case frame corresponding to the syntactic tree node if the deep case frame is not established, and outputs a part of the semantic structure in the analysis object frame by linking the head verb frame and the deep case frame by the deep case relation.

The part 255 for obtaining moved surface case information uses the surface case, the voice and other conditions such as on the presence or absence of a syntactic tree node as searching keys so as to output the moved surface case information, if the surface case information could not be obtained as a result of the process by the part 251, or if the syntactic tree node could not be obtained as a result of the part 1 (252), or if the syntactic tree node in which the result of the process by the part 1 (253) is matching could not be obtained, in other words, if there is not the syntactic tree node accompanied with the information which is the same as the constraints. The moved surface case information includes a set of the position of the moved surface case and the constraint conditions corresponding to the searching keys, the set being included in verb semantic information which accompanies the head verb node.

The syntactic tree node obtaining part 2 (256) receives the moved surface case, and outputs a syntactic tree node corresponding to the surface case with reference to the knowledge of positions in a syntactic tree.

The constraint comparing part 2 (257) receives the syntactic tree node and constraints in the moved surface case information. Then, the part 2 (257) compares information including a type, a subdivided type and semantic information of a phrase or a part of speech which accompanies the syntactic tree node with the constraints, and outputs the result of the comparison.

The deep case frame generation part 2 (258) receives the syntactic tree node in which the result of the process of the constraint comparing part 2 (257) is matching. Then, the part 2 (258) establishes a deep case frame corresponding to the syntactic tree node if the deep case frame has not been established, and outputs a part of the semantic structure in the analysis object frame by linking the head verb frame and the deep case frame by the deep case relation.

In the following, the operation of the above configuration will be described.

Figure 6:
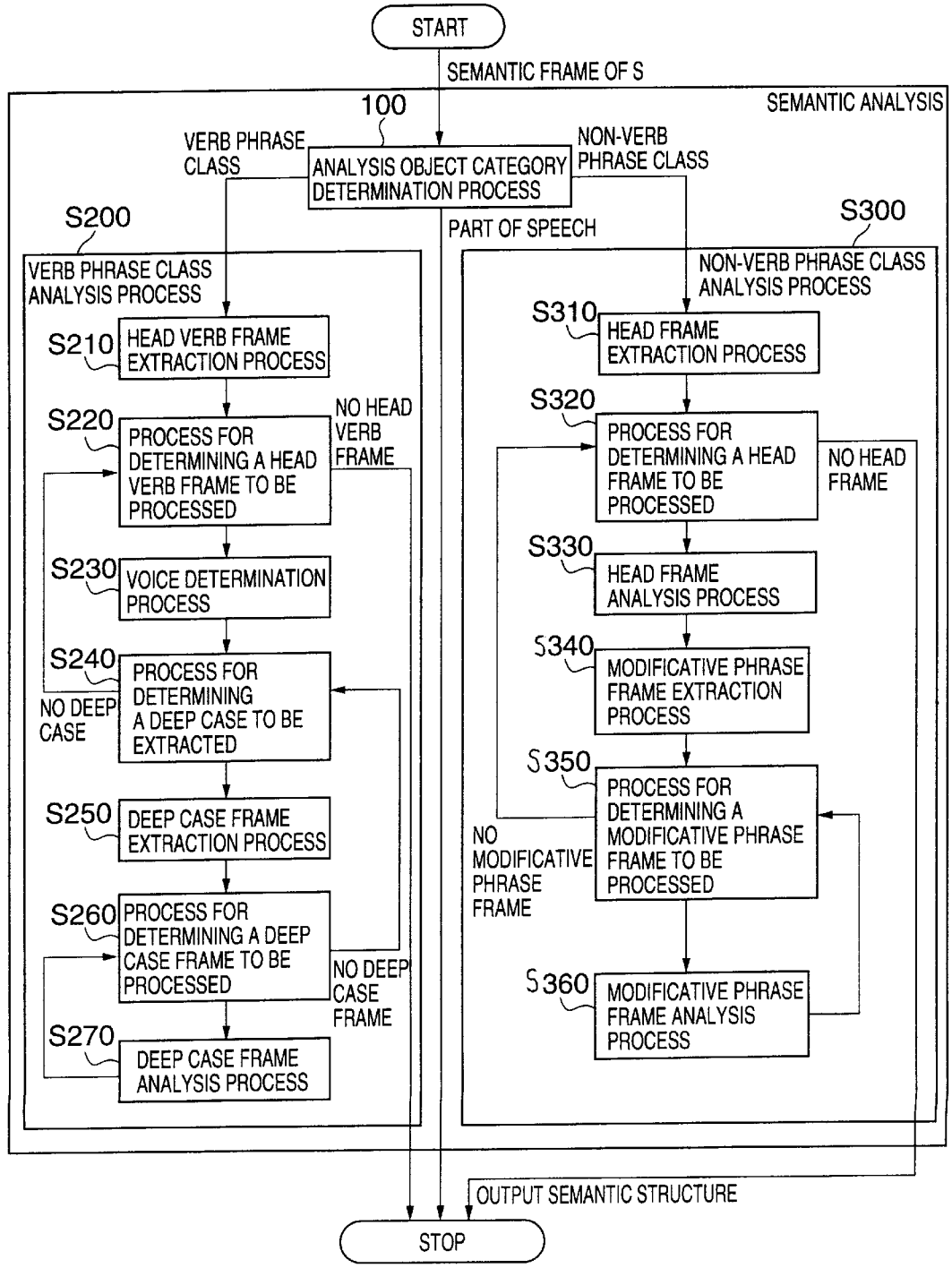
FIG. 6 is a flowchart showing the operation of the semantic analysis apparatus according to the present invention.

FIG. 6 is a flowchart showing the operation of the semantic analysis apparatus. In the semantic analysis flowchart described below, it is assumed that a semantic frame has been established so as to input the semantic frame, the semantic frame corresponding to a node of a sentence (S) which is a top node of the syntactic tree which has been already obtained by syntactic analysis.

(Step 100) The analysis object category determination part 100 receives a frame, and regards the node corresponding to the frame as an analysis object. Then, the part 100 determines whether the analysis object is the verb phrase class which has a verb as the head, or the non-verb phrase class which has mainly a noun as the head, or the part of speech with reference to the classification knowledge of analysis object categories stored in the unit 400 by using the node information which includes the type of a phrase or a part of speech and the subdivided type of a phrase. According to the result of the determination, if the analysis object is the verb phrase class, a process for analyzing the verb phrase class will be carried out in step 200. If the analysis object is the non-verb phrase class, a process for analyzing the non-verb phrase class will be carried out in step 300. If the analysis object is the part of speech, the semantic analysis ends.

(Step 200) The verb phrase class analysis is carried out.

(Step 210) The head verb frame extraction part 210 receives the analysis object, and obtains a verb node which is the head of the analysis object with reference to the knowledge of positions in a syntactic tree which is stored in the unit 500. Then, the part 210 establishes a head verb frame corresponding to the verb node and links an analysis object frame corresponding to the analysis object and the head verb frame by the head relation. As a result, the part 210 outputs a part of the semantic structure in the analysis object frame.

(Step 220) The part 220 for determining a head verb frame to be processed receives a plurality of the head verb frames as input, determines a head verb frame on which a deep case analysis will be performed in a later process, and, then, outputs the determined head verb frame.

(Step 230) The voice determination part 230 receives the analysis object and the head verb node as input, determines the voice of the analysis object with reference to voice information accompanying a node which includes the analysis object, and then outputs the voice.

(Step 240) The part 240 for determining a deep case to be extracted receives the head verb node as input, determines a deep case to be extracted from deep cases included in verb semantic information which accompanies the head verb node, and outputs the deep case.

(Step 250) The deep case frame extraction part 250 receives the analysis object, the head verb node, the deep case and the voice as input, and obtains a syntactic tree corresponding to the deep case. If the deep case frame has not been established, the part 250 establishes the deep case frame. Then, the part 250 outputs a part of the semantic structure in the analysis object frame by linking the head verb frame and the deep case frame by the deep case relationship. The detailed description of the step 250 will be given later.

(Step 260) The part 260 for determining a deep case frame to be processed receives a plurality of the deep case frames which are newly established in the deep case frame extraction part 250 in step 250. Then, the part 260 determines which deep case frame is to be analyzed among the deep case frames so as to output the determined deep case frame.

(Step 270) The deep case frame analysis part 270 receives the deep case frame as input, and outputs the semantic structure in the deep case frame by repeating the semantic analysis process recursively.

When the process of deep case frame analysis (step 270) is completed, the process for determining a deep case frame to be processed (step 260) is carried out again. As a result of the step 260, if the deep case frame to be processed does not exist any more, the process for determining a deep case to be extracted (step 240) is carried out again. As a result of the step 240, if the deep case to be extracted does not exist, the process for determining a head verb frame to be processed (step 220) is carried out again. As a result of the step 220, if the head verb frame to be processed does not exist, the semantic analysis including the verb phrase class analysis process (step 200) ends.

In the following, a non-verb phrase class analysis process (step 300) will be described.

(Step 310) The head frame extraction part 310 receives the analysis object as input, and obtains a phrase node or a part of speech node which is the head of the analysis object with reference to the knowledge of positions in a syntactic tree. Then, the part 310 establishes a head frame corresponding to the head node and links an analysis object frame corresponding to the analysis object and the head frame by the head relation. As a result, the part 310 outputs a part of the semantic structure in the analysis object frame.

(Step 320) The part 320 for determining a head frame to be processed receives a plurality of the head frames, determines which head frame will be analyzed in a later process, and, then, outputs the determined head frame.

(Step 330) The head frame analysis part 330 receives the head frame, and outputs the semantic structure in the head frame by repeating the semantic analysis process recursively.

(Step 340) The modificative phrase frame extraction part 340 receives the analysis object and the head node as input, and obtains a modificative phrase node modifying the head node with reference to the knowledge of positions in a syntactic tree. If a modificative phrase frame corresponding to the modificative phrase node has not been established, the part 340 establishes the modificative phrase frame. Then, the part 340 outputs a part of the semantic structure in the analysis object frame by linking the head frame and the modificative phrase frame by the modificative relation.

(Step 350) The part 350 for determining a modificative phrase frame to be processed receives a plurality of the modificative phrase frames which are newly established in the modificative phrase frame extraction part 340 in step 340. Then, the part 350 determines which modificative phrase frame is to be analyzed among the modificative phrase frames so as to output the determined modificative phrase frame.

(Step 360) The modificative phrase frame analysis part 360 receives the modificative phrase frame as input, and outputs the semantic structure in the modificative phrase frame by repeating the semantic analysis process recursively.

When the modificative phrase frame analysis process (step 360) Is completed, the process for determining a modificative phrase frame to be processed (step 350) is carried out again. As a result of the step 350, if the modificative phrase frame to be processed does not exist any more, the process for determining a head frame to be processed (step 320) is carried out again. As a result of the step 320, if the head frame to be processed does not exist, the semantic analysis including the non-verb phrase class analysis process (step 300) ends.

In the following, a deep case frame extraction process (step 250) in the deep case frame extraction part 250 will be described.

Figure 7:
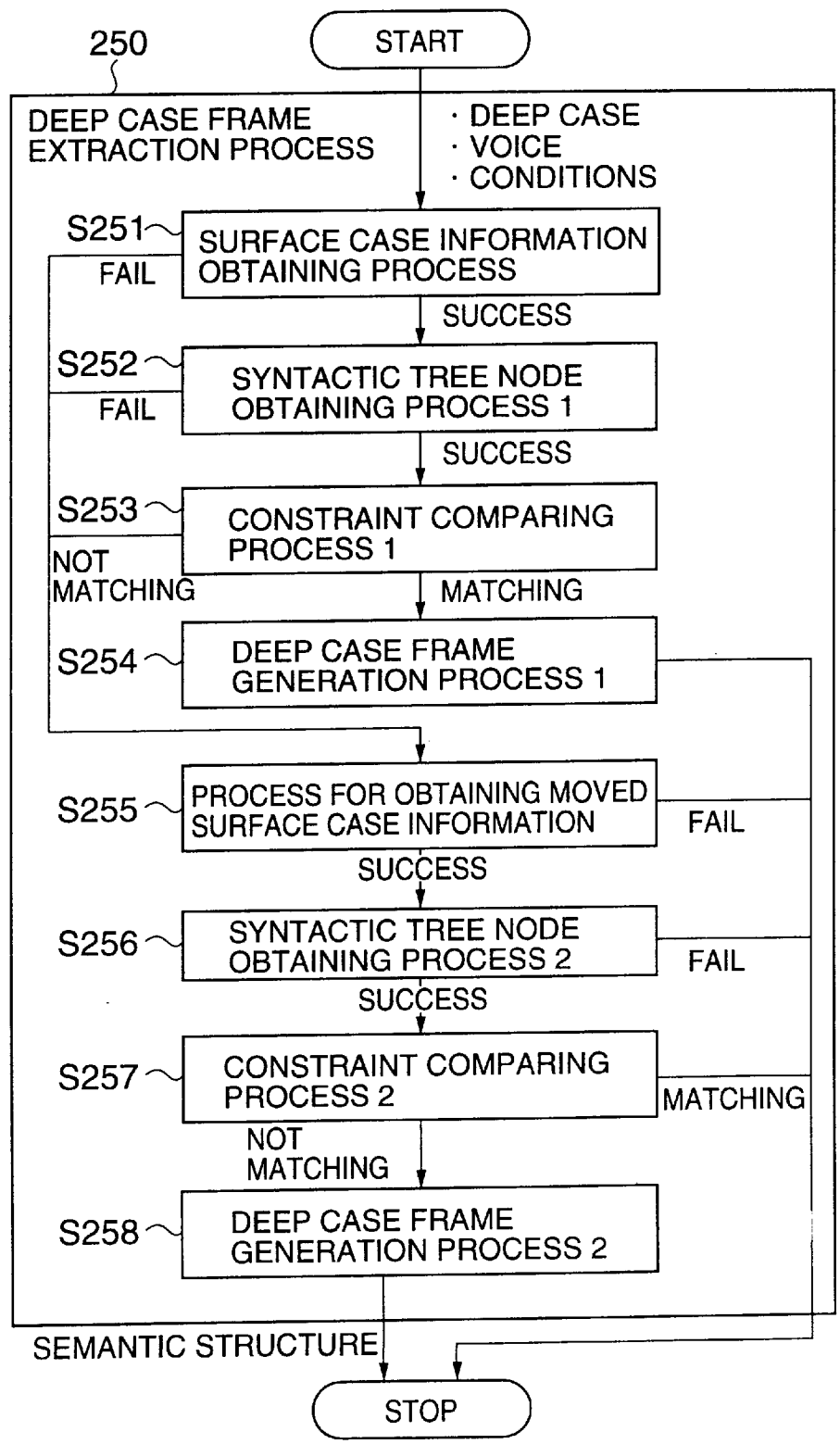
FIG. 7 is a flowchart showing a deep case frame extraction process according to the present invention.

FIG. 7 is a flowchart showing the deep case frame extraction process.

(Step 251) The surface case information obtaining part 251 uses the deep case determined by the process for determining a deep case to be extracted (step 240), the voice determined by the voice determination process (step 230) and other conditions such as on the presence or absence of a syntactic tree node as searching keys so as to output surface case information. The surface case information includes a set of the surface case and the constraint conditions corresponding to the searching keys, the surface case information being included in verb semantic information which accompanies the head verb node. If the surface case information is successfully obtained, the process moves to a syntactic tree node obtaining process 1 (step 252). If the surface case information is not obtained, the process moves to a process for obtaining moved surface case information (step 255).

(Step 252) The syntactic tree node obtaining part 1 (252) receives the surface case of the surface case information, and outputs a syntactic tree node corresponding to the surface case with reference to the knowledge of positions in a syntactic tree. If the syntactic tree node is successfully obtained, the process moves to a constraint comparing process 1 (step 253). If the syntactic tree node is not obtained, the process moves to the process for obtaining moved surface case information (step 255).

(Step 253) The constraint comparing part 1 253) receives the syntactic tree node and constraints in the surface case information as input. Then, the part 1 (253) compares information including a type, a subdivided type and semantic information of a phrase or a part of speech which accompanies the syntactic tree node with the constraints, and outputs the result of the comparison. If there is a syntactic tree node in which the result of the process is matching, the process moves to a deep case frame generation process 1 (step 254). If not, the process moves to the process for obtaining moved surface case information (step 255).

(Step 254) The deep case frame generation part 1 (254) receives the syntactic tree node in which the result of the constraint comparing process 1 (253) is matching as input. Then, the part 1 (254) establishes a deep case frame corresponding to the syntactic tree node if the deep case frame has not been established, and outputs a part of the semantic structure in the analysis object frame by linking the head verb frame and the deep case frame by the deep case relation. When the step 254 is completed, the deep case frame extraction process (step 250) ends.

(Step 255) The part 255 for obtaining moved surface case information uses the deep case, the voice and other conditions such as on the presence or absence of a syntactic tree node as searching keys so as to output moved surface case information. The moved surface case information includes set of the moved surface case and the conditions corresponding to the searching keys, the moved surface case information being included in verb semantic information which accompanies the head verb node. If the moved surface case information is successfully obtained, the process moves to a syntactic tree node obtaining process 2 (step 256). If not, the deep case frame extraction process (step 250) ends.

(Step 256) The syntactic tree node obtaining part 2 (256) receives the moved surface case in the moved surface case information as input, and outputs a syntactic tree node corresponding to the moved surface case with reference to the knowledge of positions in a syntactic tree. If the syntactic tree node is successfully obtained, the process moves to a constraint comparing process 2 (step 257). If not, the deep case frame extraction process (step 250) ends.

(Step 257) The constraint comparing part 2 (257) receives the syntactic tree node and constraints in the moved surface case information as input. Then, the part 2 (257) compares information including a type, a subdivided type and semantic information of a phrase or a part of speech which accompanies the syntactic tree node with the constraints, and outputs the result of the comparison. If there is a syntactic tree node in which the result is matching, the process moves to a deep case frame generation process 2 (step 258). If not, the deep case frame extraction process (step 250) ends.

(Step 258) The deep case frame generation part 2 (258) receives a syntactic tree node in which the result of the constraint comparing process 2 (step 257) is matching. Then, the part 2 (258) establishes a deep case frame corresponding to the syntactic tree node if the deep case frame has not been established, and outputs a part of the semantic structure in the analysis object frame by linking the head verb frame and the deep case frame by the deep case relation. When the step 258 is completed, the deep case frame extraction process (step 250) ends.

In the following, a first embodiment of the present invention will be described with reference to the figures. Specifically, the operation of the semantic analysis will be described by using an example of a natural language sentence text.

Figures 8A, 8B:
FIG. 8A is a diagram for explaining types of phrases and corresponding symbols according to a first embodiment of the present invention.
FIG. 8B is a diagram for explaining types of part of speech and corresponding symbols according to a first embodiment of the present invention.

FIG. 8A is a diagram for explaining types of phrases and corresponding symbols, and FIG. 8B is a diagram for explaining types of part of speech and corresponding symbols according to the first embodiment of the present invention. Hereinafter, "I want to stay at a hotel with steeples in Tokyo." is taken as an example of a natural language sentence text. FIG. 9 shows a syntactic tree of the natural language sentence text of the first embodiment of the present invention. An index is added to each of the symbols so as to distinguish different nodes which have the same symbol. Each of the nodes of the syntactic tree has set of attributes and corresponding values in which the attributes includes a type of a phrase or a part of speech, a subdivided type of the phrase, semantic information, a voice and the like.

Figure 10:
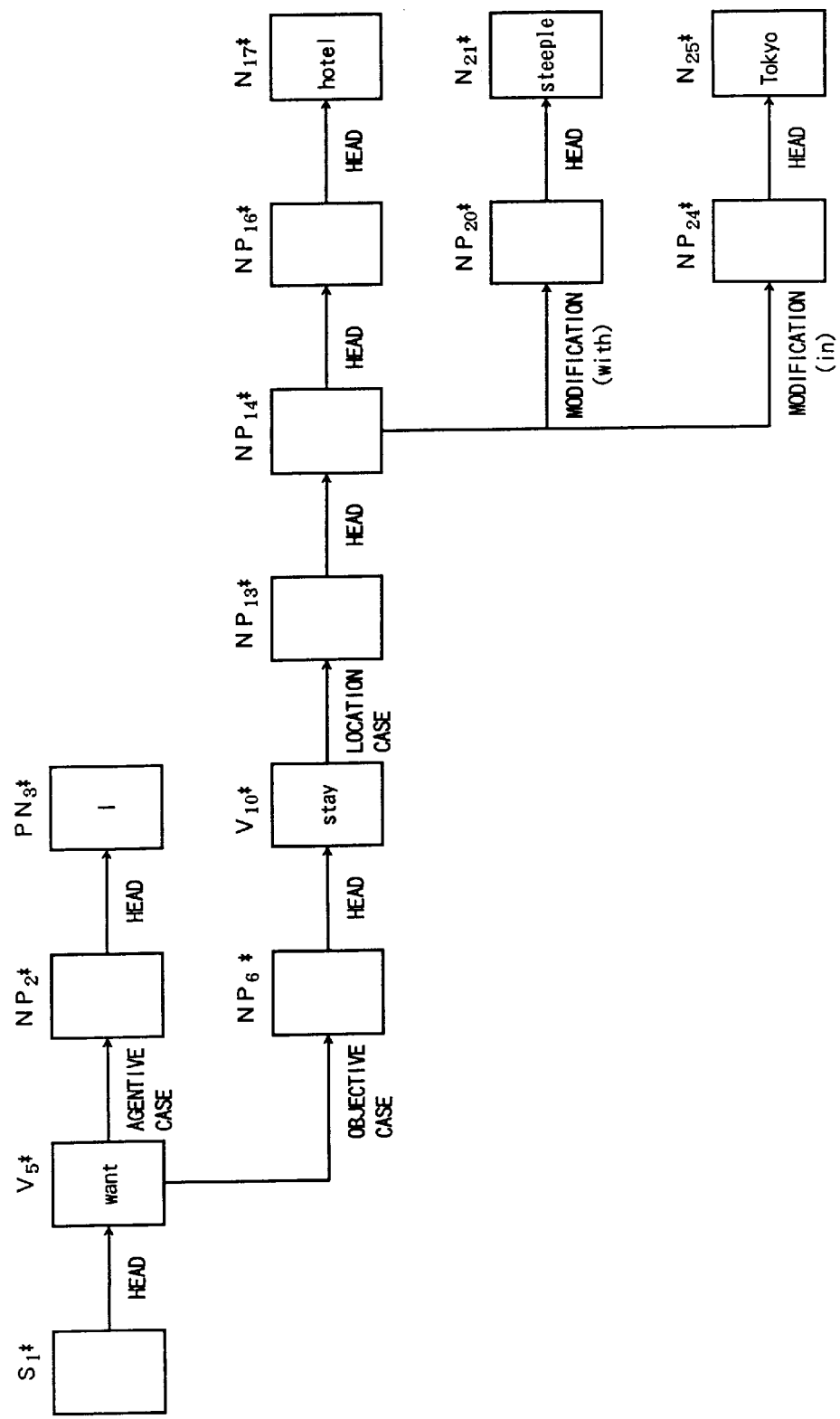
FIG. 10 is a diagram showing a semantic structure which is output by semantic analysis processing according to the first embodiment of the present invention.

FIG. 10 shows the semantic structure which is output by semantic analysis processing according to the first embodiment of the present invention. The semantic structure includes semantic frames corresponding to nodes of the syntactic tree, and a set of links of the head relation, the deep case relation and the modificative relation which links the semantic frames. In FIG. 10, the semantic frame is represented by a bounding rectangle, and the link is represented by an arrow connecting the semantic frames. A semantic frame corresponding to a node X of the syntactic tree is represented as X*.

A link accompanied with "HEAD" is a head relation link. A link accompanied by a name of a deep case such as "AGENTIVE CASE", "OBJECTIVE CASE", "LOCATION CASE" and the like is a deep case relation link. In addition, a link accompanied by "MODIFICATION" is a modificative relation link.

Figure 11:
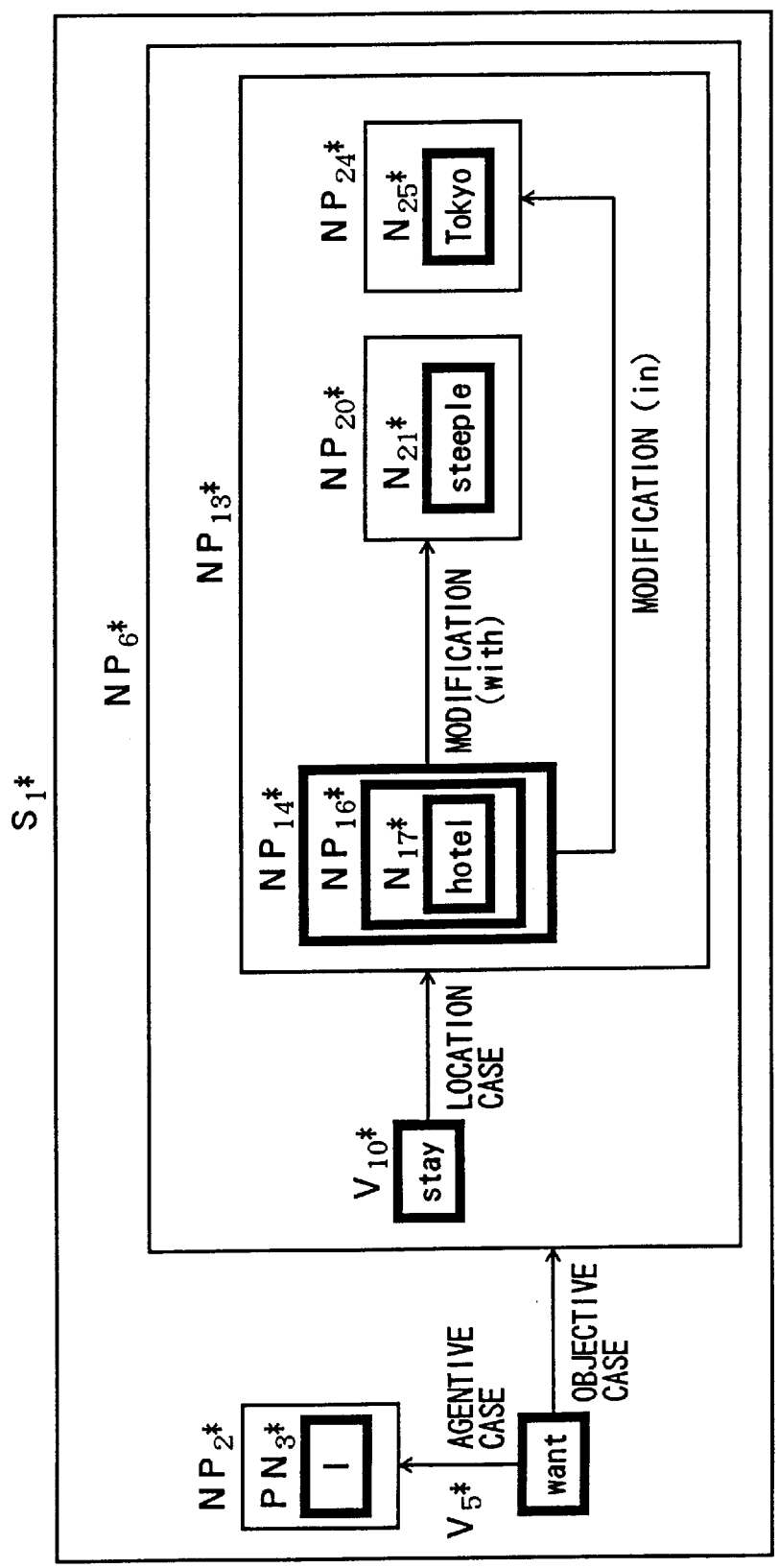
FIG. 11 is a diagram showing visually the semantic structure which is output by the semantic analysis processing when the syntactic tree of the first embodiment is input.

FIG. 11 is a diagram showing visually the semantic structure which is output by the semantic analysis processing when the syntactic tree of the first embodiment is input. A semantic frame which becomes the head of a semantic frame X* is represented by a bounding rectangle of thick line which is located in the inside of X*. In addition, the head relation link is omitted. For example, PN3* is the head of the NP2*.

FIG. 12 shows an example of the classification knowledge of analysis object categories stored in the unit 400 according to the first embodiment of the present invention. FIG. 12 shows how an analysis object is classified into the verb phrase class or the non-verb phrase class for each type of the analysis object, the type of the analysis object being a combination of the corresponding phrase and the subdivided type.

Figures 13A, 13B, 13C:
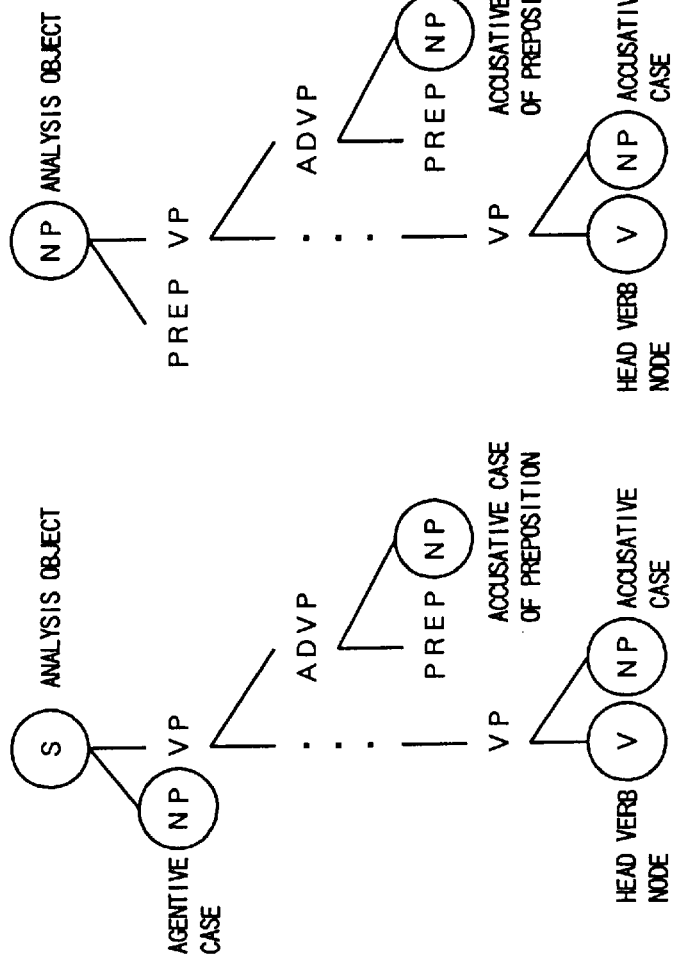
FIGS. 13A–13C show examples of knowledge of position in a syntactic tree stored in a unit 500 according to the first embodiment of the present invention.

FIGS. 13A–13C show examples of the knowledge of position on syntactic tree stored in the unit 500. As shown in the figures, positions of the head of an analysis object, the surface case of the head and the modificative phrase modifying the head are defined on the syntactic tree for each type of the analysis object. FIG. 13A shows positions when the analysis object is S and the subdivided type is "including VP directly below S". FIG. 13B shows positions when the analysis object is NP and the subdivided type is an infinitive phrase. FIG. 13C shows positions when the analysis object is NP and the subdivided type is general or a pronoun.

FIGS. 14A–14B shows examples of values of semantic information of verb nodes of the syntactic tree of the first embodiment of the present invention. The semantic information of a verb is a set of combinations of a deep case, a constraint condition which defines the attribute of a phrase corresponding to the deep case and surface cases of each voice corresponding to the deep case. The kind of the deep case as an object to be analyzed is included in the semantic information of a verb.

FIG. 14A is the semantic information of a verb node $V_5$ (want) of the syntactic tree shown in FIG. 9. In the case shown in FIG. 14A, the phrase in which the deep case is an agentive case is a noun phrase, and the semantic information of the phrase is "man". The surface case is a nominative case when the voice of the analysis object which has the verb "want" as the head is the active voice. When the voice is the passive voice, the surface case is an accusative case of the preposition "by". FIG. 14B shows the semantic information of the verb node $V_{10}$ (stay).

In the following, the operation of the semantic analysis will be described when the syntactic tree in FIG. 9 is input. For the sake of simplicity, the first embodiment will be described according to the main part of the flowchart shown in FIG. 6. Thus, a part of processes which need a conditional jump are omitted, and it is assumed that the flowchart in FIG. 7 has only S251–S254. A detailed description will be given in a second embodiment later.

Referring to FIG. 10 as well as other figures helps to understand the following description.

In the first embodiment, a semantic frame S1* which corresponds to the top node S1 of the syntactic tree is established so as to input S1* to the semantic analysis apparatus.

To begin with, since the subdivided type of the analysis object S1 is "including VP directly below" according to information accompanying the analysis object S1, S1 is determined to be a verb phrase class according to the classification knowledge of analysis object categories in FIG. 12 (step 100—the analysis object category determination process).

The head verb node of the analysis object S1 is V5 "want" in FIG. 9 according to the knowledge in FIG. 13A. Then, a semantic frame V5* corresponding to V5 is established, and S1* and V5* are linked by the head relation (step 200—the verb phrase analysis process, step 210—the head verb frame extraction process).

The voice of S1 is determined to be the active voice according to the information accompanying the analysis object S1 (step 230—the voice determination process).

The semantic meaning of V5 is shown in FIG. 14A according to the information included in the head verb node V5. According to the deep case shown in FIG. 14A, the deep case to be extracted is determined as the agentive case (step 240—the process for determining the deep case to be extracted).

Since the voice of the analysis object S1 is the active voice, the surface case is the nominative case according to FIG. 14A (step 250—the deep case frame extraction process, step 251—the surface case information obtaining process).

The nominative case in the analysis object S1 is NP2 in FIG. 9 according to FIG. 13A (step 252—the syntactic tree node obtaining process). It is determined by FIG. 14A that the constraint condition of the agentive case as the deep case is "noun phrase" and the semantic information is "man". According to the information accompanying NP2, the comparing result becomes matching since NP2 is the noun phrase and has "man" as the semantic information (step 253—the constraint condition comparing process).

A semantic frame NP2* corresponding to NP2 is established and an agentive case relation link is set from V5* to NP2* (step 254—the deep case frame generation process). Then, the semantic analysis is repeated recursively by inputting NP2* (step 270—deep case frame analysis process).

Since the subdivided type of the analysis object NP2 is the pronoun according to the information accompanying the analysis object NP2, NP2 is determined to be the non-verb phrase class according to the classification knowledge shown in FIG. 12 (step 100—the analysis object category determination process).

The head node of the analysis object NP2 is PN3 (I) in FIG. 9 according to FIG. 13C. Then, a semantic frame PN3* corresponding to PN3 is established, and a head relation link is set from NP2* to PN3* (step 300—the non-verb phrase class analysis process, step 310—the head frame extraction process). Since PN3 is the part of speech, nothing is done to PN3 (step 330—the head frame analysis process).

There is no modificative phrase which modifies the head node PN3 of the analysis object NP2 according to FIG. 13C (step 340—the modificative phrase frame extraction process).

As a result of the modificative phrase frame extraction process in step 340, it is determined that the modificative phrase frame has not been established, and the semantic analysis of the analysis object frame NP2* ends (step 350—the process for determining modificative phrase frame to be processed).

Next, an extraction object which has not been selected as the extraction object is selected among the deep cases in FIG. 14A which show the semantic information of the head verb node V5. Then, the deep case to be extracted is determined as the objective case (step 240—the process for determining deep case to be extracted).

Since the voice of the analysis object S1 is the active voice, the surface case is the accusative case according to FIG. 14A (step 250—the deep case frame extraction process, the step 251—surface case information obtaining process).

The accusative case in the analysis object S1 is NP6 in FIG. 9 according to FIG. 13A (step 252—the syntactic tree node obtaining process). As shown in FIG. 14A, the constraint condition of the objective case is obtained as "noun phrase" in which the semantic information is "matter". Since NP6 is a noun phrase and the semantic meaning is "matter" according to information accompanying NP6, the result of comparison becomes matching (step 253—the constraint condition comparing process). Then, a semantic frame NP6* corresponding to NP6 is established, and V5* and NP6* are linked by an objective case relation link. (step 254—the deep case frame generation process). Next, the semantic analysis is repeated recursively by inputting NP6* (step 270—the deep case frame analysis process).

Since the subdivided type of the analysis object NP6 is the infinitive phrase according to information accompanying the analysis object NP6, NP6 is determined to be the verb phrase class with reference to the classification knowledge of analysis object categories in FIG. 12 (step 100—the analysis object category determination process).

According to FIG. 13B, the head verb node of the analysis object NP6 becomes V10 "stay" in FIG. 9. A semantic frame V10* corresponding to V10 is established, and a head relation link is set from NP6* to V10* (step 200—the verb phrase class analysis process, step 210—the head verb frame extraction process).

The voice of NP6 is determined to be the active voice according to information accompanying the analysis object NP6 (step 230—the voice determination process). The semantic information of V10 is shown in FIG. 14B which is based on the information accompanying the head verb node V10. The deep case of the extraction object is determined to be the agentive case as shown in FIG. 14B (step 240—the process for determining deep case to be extracted).

Since the voice of the analysis object NP6 is the active voice, the surface case becomes the nominative case according to FIG. 14B (step 250—the deep case frame extraction process, step 251—the surface case information obtaining process).

It is determined that the nominative case does not exist in the analysis object NP6 according to FIG. 13B (step 252—the syntactic tree node obtaining process). Therefore, nothing is done in the steps 253—254 and 270.

Next, a deep case which has not been selected as an extraction object is selected as an extraction object among the deep cases in FIG. 14B which shows the semantic information of the head verb node V10. Then, the location case is determined as the extraction object(step 240—the process for determining deep case to be extracted). Since the voice of the analysis object NP6 is the active voice, the surface case is determined to be the accusative case of the preposition "at" (step 250—the deep case frame extraction process, step 251—the surface case information obtaining process). Then, a node is searched in NP6 in FIG. 9 on condition that the node is in the same position, specified in FIG. 13B, of the accusative case of the preposition and the preposition is "at". As a result, NP13 is obtained (step 252—the syntactic tree node obtaining process).

The constraint condition of the location case is that the location case is "noun phrase" and the semantic information is "occupation" as shown in FIG. 14B. Since NP13 is the noun phrase and the semantic information is "occupation" according to the information accompanying NP13, the result of the comparison becomes matching (step 253—the constraint condition comparing process). Then, a semantic frame NP13* corresponding to NP13 is established, and a location case relation link is set from V10* to NP13* (step 254—the deep case frame generation process).

Next, the semantic analysis process is repeated recursively by inputting NP13* (step 270—the deep case frame analysis process).

Since the subdivided type of the analysis object NP13 is "general" according to the information accompanying NP13, NP 13 is determined to be the non-verb phrase class according to the classification knowledge of analysis object categories in FIG. 12 (step 100—the analysis object category determination process).

The head node of the analysis object NP13 is NP14 In FIG. 9 according to FIG. 13C. A semantic frame NP14* corresponding to NP14 is established, and a head relation link is set from NP13* to NP14* (step 300—the non-verb phrase class analysis process, step 310—the head frame extraction process).

Next, the semantic frame process is repeated recursively by inputting NP14* (step 330—the head frame analysis process).

Since the subdivided type of the analysis object NP14 is "general" according to the information accompanying NP14, NP 14 is determined to be the non-verb phrase class according to the classification knowledge of analysis object categories in FIG. 12 (step 100—the analysis object category determination process).

The head node of the analysis object NP14 is NP16 in FIG. 9 according to FIG. 13C. A semantic frame NP16* corresponding to NP16 is established, and a head relation link is set from NP14* to NP16* (step 300—the non-verb phrase class analysis process, step 310—the head frame extraction process).

Next, the semantic frame process is repeated recursively by inputting NP16* (step 330—the head frame analysis process).

Since the subdivided type of the analysis object NP16 is "general" according to the information accompanying NP16, NP 16 is determined to be the non-verb phrase class according to the classification knowledge of analysis object categories in FIG. 12 (step 100—the analysis object category determination process).

The head node of the analysis object NP16 is NP17 in FIG. 9 according to FIG. 13C. A semantic frame NP17* corresponding to NP17 is established, and a head relation link is set from NP16* to NP17* (step 300—the non-verb phrase class analysis process, step 310—the head frame extraction process).

Since NP17 is a part of speech, nothing is done (step 330—the head frame analysis process).

It is recognized that there is no modificative phrase, in FIG. 9, which modifies the head node NP17 of the analysis object NP16 according to FIG. 13C (step 340—the modificative phrase frame extraction process). As a result of the process in step 340, it is determined that the modificative phrase frame is not established, and the semantic analysis process of the analysis object frame NP16* ends (step 350—the process for determining modificative phrase frame to be processed).

It is recognized that there is no modificative phrase, in FIG. 9, which modifies the head node NP16 of the analysis object NP14 according to FIG. 13C (step 340—the modificative phrase frame extraction process). As a result of the process in step 340, it is determined that the modificative phrase frame is not established, and the semantic analysis process of the analysis object frame NP14* ends (step 350—the process for determining modificative phrase frame to be processed).

According to FIG. 13C, the modificative phrase which modifies the head node NP14 of the analysis object NP13 is NP20 in FIG. 9. A semantic frame NP20* corresponding to NP20 is established, and a modification relation link "with" is established from NP14* to NP20* (step 340—the modificative phrase frame extraction process).

As a result of the process in step 340, it is determined that the modificative phrase frame NP20* is established (step 350—the process for determining modificative phrase frame to be processed). Then, the semantic analysis process is repeated recursively by inputting NP20* (step 360—the modificative phrase frame analysis process).

Since the subdivided type of the analysis object NP20 is "general" according to the information accompanying NP20, NP 20 is determined to be the non-verb phrase class according to the classification knowledge of analysis object categories in FIG. 12 (step 100—the analysis object category determination process).

The head node of the analysis object NP20 is N21 "steeples" in FIG. 9 according to FIG. 13C. A semantic frame N21* corresponding to N21 is established, and a head relation link is set from NP20* to N21* (step 300—the non-verb phrase class analysis process, step 310—the head frame extraction process).

Since N21 is a part of speech, nothing is done (step 330—the head frame analysis process).

It is recognized that there is no modificative phrase, in FIG. 9, which modifies the head node N21 of the analysis object NP20 according to FIG. 13C (step 340—the modificative phrase frame extraction process).

As a result of the process in step 340, it is determined that the modificative phrase frame is not established, and the semantic analysis process of the analysis object frame NP20* ends (step 350—the process for determining modificative phrase frame to be processed).

According to FIG. 13C, another modificative phrase which modifies the head node NP14 of the analysis object NP13 is NP24 in FIG. 9. A semantic frame NP24* corresponding to NP24 is established, and a modification relation link "in" is established from NP14* to NP24* (step 340—the modificative phrase frame extraction process).

As a result of the process in step 340, it is determined that the modificative phrase frame NP24* is established (step 350—the process for determining modificative phrase frame to be processed). Then, the semantic analysis process is repeated recursively by inputting NP24* (step 360—the modificative phrase frame analysis process).

Since the subdivided type of the analysis object NP24 is "general" according to the information accompanying NP24, NP 24 is determined to be the non-verb phrase class according to the classification knowledge of analysis object categories in FIG. 12 (step 100—the analysis object category determination process).

The head node of the analysis object NP24 is NP25 "Tokyo" in FIG. 9 according to FIG. 13C. A semantic frame NP25* corresponding to NP25 is established, and a head relation link is set from NP24* to NP25* (step 300—the non-verb phrase class analysis process, step 310—the head frame extraction process).

Since NP25 is a part of speech, nothing is done (step 330—the head frame analysis process).

It is recognized that there is no modificative phrase, in FIG. 9, which modifies the head node NP25 of the analysis object NP24 according to FIG. 13C (step 340—the modificative phrase frame extraction process).

As a result of the process in step 340, it is determined that the modificative phrase frame is not established, and the semantic analysis process of the analysis object frame NP24* ends (step 350—the process for determining modificative phrase frame to be processed).

It is recognized that there are no more modificative phrases, in FIG. 9, which modifies the head node NP14 of the analysis object NP13 according to FIG. 13C (step 340—the modificative phrase frame extraction process). Therefore, it is determined that the modificative phrase frame is not established, and the semantic analysis process of the analysis object frame NP13* ends (step 350—the process for determining modificative phrase frame to be processed).

Thus, all the deep cases in FIG. 14B which shows the semantic information of the head verb node V10 have been selected as the extraction object. Therefore, it is determined that there are no more deep cases of the extraction object, and the semantic analysis of the analysis object frame NP6* ends (step 240—the process for determining deep case to be extracted).

In addition, since all the deep cases in FIG. 14A which shows the semantic information of the head verb node V5 have been selected as the extraction object, it is determined that there are no more deep cases to be extracted, and the semantic analysis of the analysis object frame S1* ends (step 240—the process for determining deep case to be extracted).

According to the above-mentioned processes, the semantic structure shown in FIG. 10 or FIG. 11 can be obtained as the output result when the syntactic tree shown in FIG. 9 is input.

Next, a second embodiment of the present invention will be described.

FIG. 15A is a diagram for explaining types of phrases and corresponding symbols, and FIG. 15B is a diagram for explaining types of parts of speech and corresponding symbols according to the second embodiment of the present invention. Hereinafter, "what fish and what shellfish do they buy and sell at the market with roofs in Tokyo?" is taken as an example of a natural language sentence text. In the following, meaning of symbols is the same as that in the corresponding figures in the first embodiment.

Figure 16:
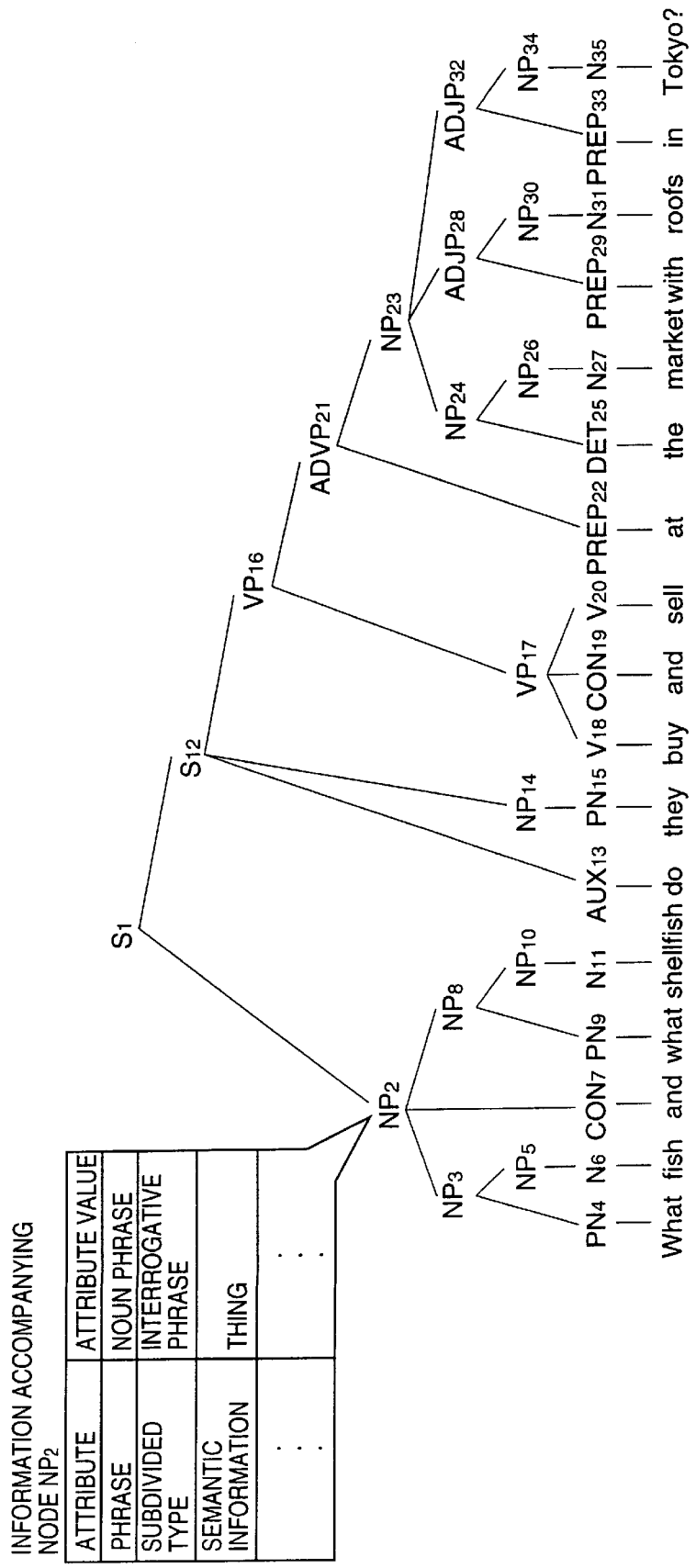
FIG. 16 shows a syntactic tree of a natural language sentence text according to the second embodiment of the present invention.
Figure 17:
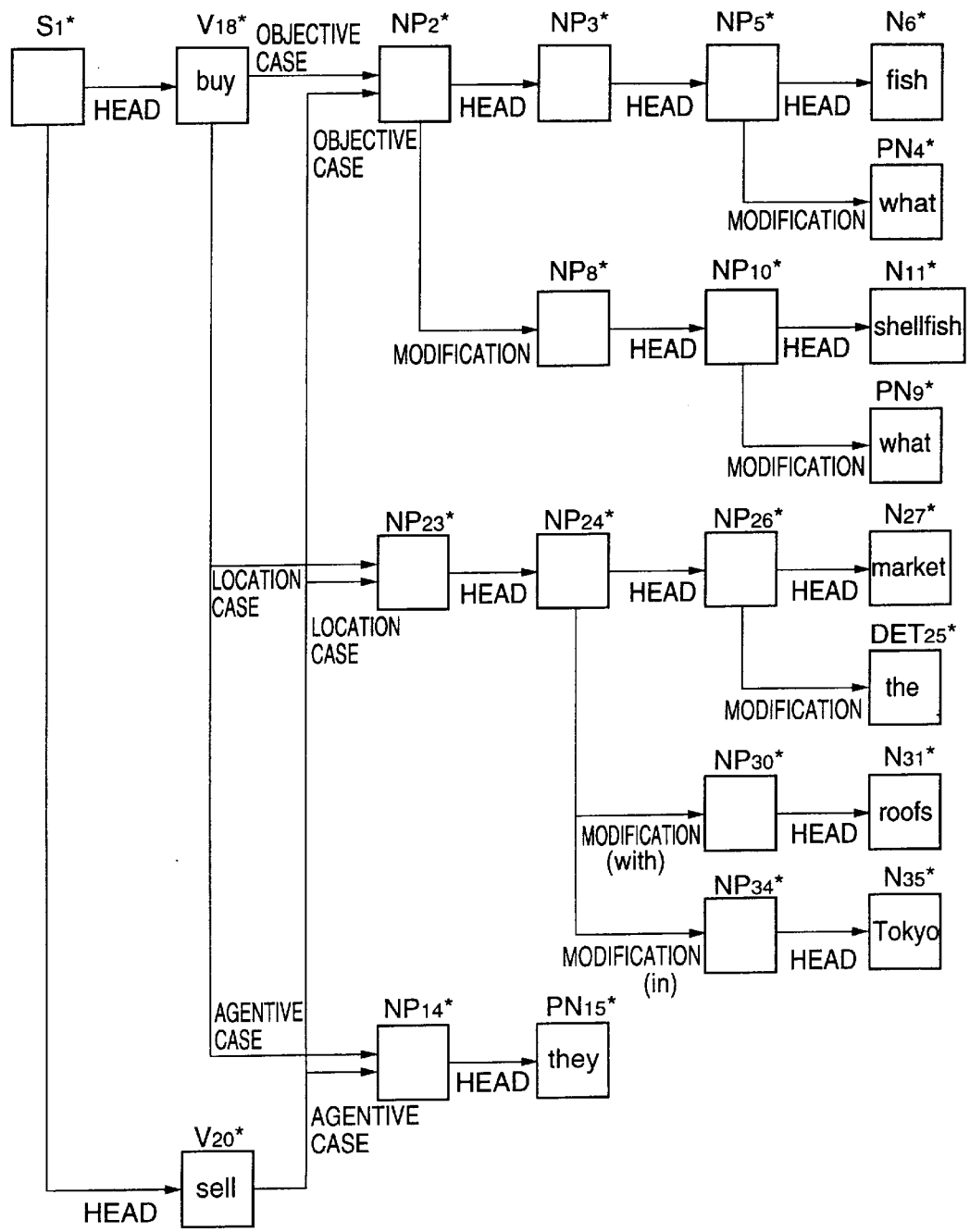
FIG. 17 shows a semantic structure which is output by semantic analysis processing according to the second embodiment of the present invention.

FIG. 16 shows a syntactic tree of the natural language sentence text of the second embodiment of the present invention. FIG. 17 shows the semantic structure which is output by semantic analysis processing according to the second embodiment of the present invention.

Figure 18:
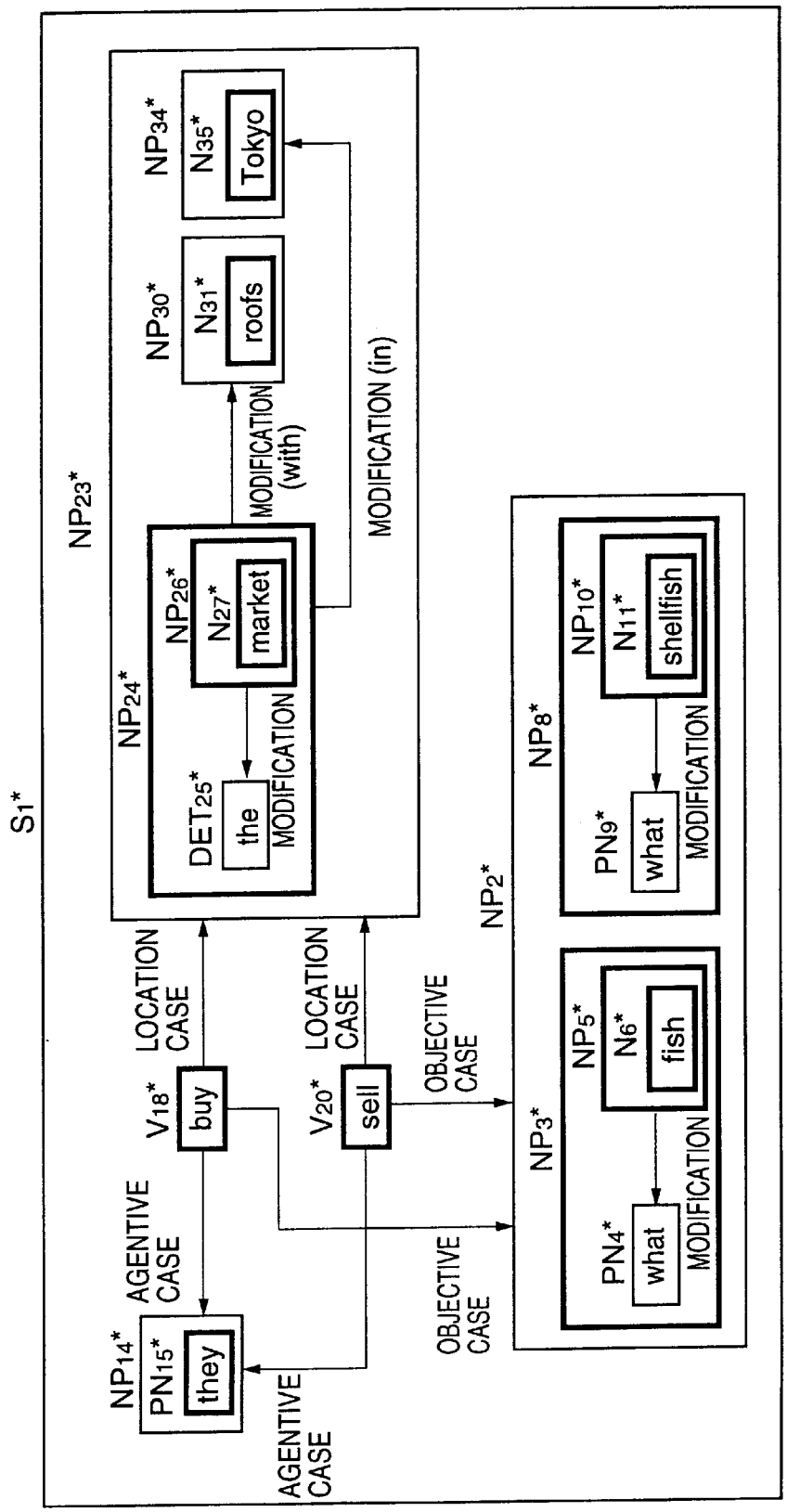
FIG. 18 is a diagram showing visually the semantic structure which is output by the semantic analysis processing when the syntactic tree of the second embodiment is input.

FIG. 18 is a diagram showing visually the semantic structure which is output by the semantic analysis processing when the syntactic tree of the second embodiment is input.

FIG. 19 shows an example of the classification knowledge of analysis object categories stored in the unit 400 according to the second embodiment of the present invention.

FIG. 20 shows an example of knowledge of normal positions of the surface case in the knowledge of positions in a syntactic tree stored in the unit 500 according to the second embodiment of the present invention.

In FIGS. 20, (A)–(D) show positions of the head node, the accusative case, the nominative case and the accusative case of a preposition respectively in which the analysis object is S and the subdivided type is an interrogative sentence with an interrogative. In each cases, head verb nodes are connected by a conjunction in parallel. (E) shows an example of the position of head nodes in the case when the analysis object is NP and the subdivided type is an interrogative phrase. Each of (F) and (G) shows another example of the position of the head node and a modificative phrase in the case when the analysis object is NP and the subdivided type is the interrogative phrase. Each of (H) and (I) shows an example of the position of the head node and the modificative phrase in the case when the analysis object is NP and the subdivided type is general.

FIG. 21 shows an example of knowledge of positions of the moved surface case in the knowledge of positions in a syntactic tree stored in the unit 500 when there is no node corresponding to a surface case of the head in the syntactic tree according to the second embodiment of the present invention. In FIG. 21, (A) shows an example of the position of the moved accusative case. (B) shows another example of the position of the moved accusative case. An example corresponding to NP of this case is "beer to drink". NP "beer" is the moved accusative case of the verb "drink" in ADJP "to drink".

FIG. 22 shows an example of values of semantic information of verb nodes of the syntactic tree of the second embodiment of the present invention. The semantic information of a verb includes set of first searching keys and surface case information corresponding to the searching keys, and set of second searching keys and the moved surface case information corresponding to the second searching keys. The searching keys includes combinations of the deep case, the voice, and preconditions on the presence or absence of the syntactic tree node and the like. The surface information includes the surface case and a constraint condition which defines the attribute of a phrase.

In FIG. 22, the semantic information of a verb node $V_{18}$ (buy) and V20 (sell) of the syntactic tree is shown. The phrase in which the deep case is an agentive case is a noun phrase, and the semantic information of the phrase is man. The surface case is the nominative case when the voice of the analysis object having the verb node as a head is the active voice. When the voice is passive voice, the surface case is the accusative case of the preposition "by". In addition, when the voice is active voice and when a node corresponding to the nominative case does not exist in the syntactic tree, the surface case is the moved nominative case. When the voice is passive voice and when the agentive case can not be obtained, the surface case is in the position of the moved accusative case of the preposition "by".

In the following, the operation of the semantic analysis will be described in detail when the syntactic tree in FIG. 16 is input according to the flowchart shown in FIG. 6 and FIG. 7. Referring to FIG. 17 as well as other figures helps to understand the following description.

Here, a semantic frame S1* corresponding to the top node S1 of the syntactic tree is established, and applied to the semantic analysis as input.

To begin with, since the subdivided type of the analysis object S1 is the interrogative sentence with interrogative according to information accompanying the analysis object S1, S1 is determined to be a verb phrase class according to the classification knowledge of analysis object categories in FIG. 19 (step 100—the analysis object category determination process).

The head verb node of the analysis object $S_1$ is $V_{18}$ "buy" and V20 "sell" in FIG. 16 according to the knowledge in FIG. 20(A). Then, a semantic frame V18* corresponding to V18 is established, and a head relation link is established from S1* to V18*. In addition, a semantic frame V20* corresponding to V20 is established, and a head relation link is established from S1* to V20* (step 200—the verb phrase class analysis process, step 210—the head verb frame extraction process).

In the head verb frame obtained in the step 210, the head verb frame which will be processed is determined to be V18* (step 220—the process for determining a head verb frame to be processed).

The voice of $S_1$ is determined to be the active voice according to the information accompanying an upper object VP17 of the head verb node V18 (step 230—the voice determination process).

The semantic meaning of V18 is shown in FIG. 22 according to the information included in the head verb node V18. According to the deep case shown in FIG. 22, the deep case to be extracted is determined as the agentive case (step 240—the process for determining deep case to be extracted).

Then, surface case information (the surface case: accusative case, the constraint condition: noun phrase in which the semantic information is thing) is obtained by using a searching key (the deep case: accusative case, the voice: active voice, the precondition: none) according to the values shown in FIG. 22 (step 250—the deep case frame extraction process, step 251—the surface case information obtaining process).

It is recognized that the accusative case as the surface case of the analysis object S1 does not exist in the syntactic tree shown in FIG. 16 according to FIG. 20B (step 252—the syntactic tree node obtaining process 1). Next, the moved surface case information (the surface case: moved accusative case, the constraint condition: noun phrase in which the semantic information is thing) is obtained by using a searching key (the deep case: objective case, the voice: active voice, the precondition: no accusative case node) according to FIG. 22 (step 255—the process for obtaining moved surface case information).

According to FIG. 21(A), the moved accusative case becomes NP2 in FIG. 16 (step 256—the syntactic tree node obtaining process 2). Since the constraint condition in the moved surface case information is "noun phrase in which the semantic information is a thing", and NP2 is also the noun phrase in which the semantic information is a thing according to the information accompanying NP2, the result of the comparison is matching (step 257—the constraint condition comparing process 2). Since the semantic frame corresponding to NP2 has not been established, the semantic frame NP2* is established and an objective case relation link is set from V18* to NP2* (step 258—the deep case frame generation process 2).

The objective frame which will be processed is determined to be NP2* among the objective frames newly established in step 250 (step 260—the process for determining deep case frame to be processed). Then, the semantic analysis is repeated recursively by inputting NP2* (step 270—deep case frame analysis process).

Since the subdivided type of the analysis object NP2 is the interrogative phrase according to information accompanying the analysis object NP2, NP2 is determined to be a non-verb phrase class according to the classification knowledge of analysis object categories in FIG. 19 (step 100—the analysis object category determination process).

The head nodes of the analysis object NP2 are NP3 and NP8 in FIG. 16 according to FIG. 20(E). Then, a semantic frame NP3* corresponding to NP3 is established, and a head relation link is set from NP2* to NP3*. In addition, a semantic frame NP8* corresponding to NP8 is established, and a head relation link is set from NP2* to NP8*. (step 300—the non-verb phrase class analysis process, step 310—the head frame extraction process).

In the head frames obtained in the step 310, the head verb frame which will be processed is determined to be NP3* (step 320—the process for determining a head frame to be processed). Next, the semantic analysis process is repeated recursively by inputting NP3* (step 330—the head frame analysis process).

Since the subdivided type of the analysis object NP3 is the interrogative phrase according to information accompanying the analysis object NP3, NP3 is determined to be a non-verb phrase class according to the classification knowledge of analysis object categories in FIG. 19 (step 100—the analysis object category determination process).

Since the head node of the analysis object NP3 is NP5 in FIG. 16 according to FIG. 20(F), a semantic frame NP5* corresponding to NP5 is established, and a head relation link is set from NP3* to NP5*. (step 300—the non-verb phrase class analysis process, step 310—the head frame extraction process).

In the head frames obtained in the step 310, the head verb frame which will be processed is determined to be NP5* (step 320—the process for determining a head frame to be processed). Next, the semantic analysis process is repeated recursively by inputting NP5* (step 330—the head frame analysis process).

Since the subdivided type of the analysis object NP5 is general according to information accompanying the analysis object NP5, NP5 is determined to be a non-verb phrase class according to the classification knowledge of analysis object categories in FIG. 19 (step 100—the analysis object category determination process).

Since the head node of the analysis object NP5 is N6 in FIG. 16 according to the knowledge of positions in a syntactic tree, a semantic frame N6* corresponding to N6 is established, and a head relation link is set from NP5* to NP6*. (step 300—the non-verb phrase class analysis process, step 310—the head frame extraction process).

In the head frames obtained in the step 310, the head frame which will be processed is determined to be N6* (step 320—the process for determining a head frame to be processed). Next, the semantic analysis process is repeated recursively by inputting N6* (step 330—the head frame analysis process).

Since the analysis object N6 is part of speech according to information accompanying the analysis object N6, the semantic analysis of the analysis object frame N6* ends. (step 100—the analysis object category determination process).

According to the knowledge of position of syntactic tree, it is recognized that there is no modificative phrase which modifies the head node N6 of the analysis object NP5 in the syntactic tree in FIG. 16 (step 340—the modificative phrase frame extraction process). Therefore, since there is no modificative phrase frame set newly in step 340, it is determined that there is no modificative phrase frame which will be processed (step 350—the process for determining modificative phrase frame to be processed).

Since all head frames established in step 310 are processed, it is determined that there is no more head frame to be processed, and the semantic analysis process of the analysis object frame NP5* ends (step 320—the process for determining a head frame to be processed).

According to FIG. 20(G), the modificative phrase which modifies the head node NP5 of the analysis object NP3 is PN4 in FIG. 16. Since a semantic frame corresponding to PN4 has not been established, a semantic frame PN4* is established and a modificative relation link is set from NP5* to PN4 (step 340—the modificative phrase frame extraction process). Then, it is determined that the modificative phrase frame to be processed is PN4* among the modificative phrase frames set newly in step 340 (step 350—the process for determining modificative phrase frame to be processed). Then, the semantic analysis process is repeated recursively by inputting PN4* (step 360—the modificative phrase frame analysis process).

Since the analysis object PN4 is part of speech according to information accompanying the analysis object PN4, the semantic analysis of the analysis object frame PN4* ends. (step 100—the analysis object category determination process).

Since all modificative phrase frames which were newly set in step 340 are processed, it is determined that there is no modificative phrase frame to be processed (step 350—the process for determining modificative phrase frame to be processed).

Since all head frames established in step 310 are processed, it is determined that there is no more head frame to be processed, and the semantic analysis process of the analysis object frame NP3* ends (step 320—the process for determining a head frame to be processed).

According to FIG. 20, it is recognized that there is no modificative phrase, in FIG. 16, which modifies the head node NP3 of the analysis object NP2 (step 340—the modificative phrase frame extraction process). Since there is no modificative phrase frame set newly in step 340, it is determined that there is no more modificative phrase frame to be processed (step 350—the process for determining modificative phrase frame to be processed).

Next, in the head frames obtained in the step 310 which have not been processed, the head frame which will be processed is determined to be NP8* (step 320—the process for determining a head frame to be processed). Then, the semantic analysis process is repeated recursively by inputting NP8* (step 330—the head frame analysis process).

Since the subdivided type of the analysis object NP8 is the interrogative phrase according to information accompanying the analysis object NP8, NP8 is determined to be a non-verb phrase class according to the classification knowledge of analysis object categories in FIG. 19 (step 100—the analysis object category determination process).

Since the head node of the analysis object NP8 is NP10 in FIG. 16 according to FIG. 20(F), a semantic frame NP10* corresponding to NP10 is established, and a head relation link is set from NP8* to NP10* (step 300—the non-verb phrase class analysis process, step 310—the head frame extraction process).

In the head frames obtained in the step 310, the head frame which will be processed is determined to be NP10* (step 320—the process for determining a head frame to be processed). Next, the semantic analysis process is repeated recursively by inputting NP10* (step 330—the head frame analysis process).

Since the subdivided type of the analysis object NP10 is general according to information accompanying the analysis object NP10, NP10 is determined to be a non-verb phrase class according to the classification knowledge of analysis object categories in FIG. 19 (step 100—the analysis object category determination process).

Since the head node of the analysis object NP10 is N11 in FIG. 16 according to the knowledge of positions in a syntactic tree, a semantic frame N11* corresponding to N11 is established, and a head relation link is set from NP10* to N11*. (step 300—the non-verb phrase class analysis process, step 310—the head frame extraction process).

In the head frames obtained in the step 310, the head frame which will be processed is determined to be N11* (step 320—the process for determining a head frame to be processed). Then, the semantic analysis process is repeated recursively by inputting N11* (step 330—the head frame analysis process).

Since the analysis object N11 is part of speech according to information accompanying the analysis object N11, the semantic analysis of the analysis object frame N11* ends. (step 100—the analysis object category determination process).

According to the knowledge of position of syntactic tree, it is recognized that there is no modificative phrase which modifies the head node N11 of the analysis object NP10 in the syntactic tree in FIG. 16 (step 340—the modificative phrase frame extraction process). Therefore, since there is no modificative phrase frame set newly in step 340, it is determined that there is no modificative phrase frame which will be processed (step 350—the process for determining modificative phrase frame to be processed).

Since all head frames established in step 310 are processed, it is determined that there is no more head frame to be processed, and the semantic analysis process of the analysis object frame NP10* ends (step 320—the process for determining a head frame to be processed).

According to FIG. 20(G), the modificative phrase which modifies the head node NP10 of the analysis object NP8 is PN9 in FIG. 16. Since a semantic frame corresponding to PN9 has not been established, a semantic frame PN9* is established and a modificative relation link is set from NP10* to PN9* (step 340—the modificative phrase frame extraction process). Then, it is determined that the modificative phrase frame to be processed is PN9* among the modificative phrase frames set newly in step 340 (step 350—the process for determining modificative phrase frame to be processed). Then, the semantic analysis process is repeated recursively by inputting PN9* (step 360—the modificative phrase frame analysis process).

Since the analysis object PN9 is part of speech according to information accompanying the analysis object PN9, the semantic analysis of the analysis object frame PN9* ends. (step 100—the analysis object category determination process).

Since all modificative phrase frames which were newly set in step 340 are processed, it is determined that there is no modificative phrase frame to be processed (step 350—the process for determining modificative phrase frame to be processed).

Since all head frames established in step 310 are processed, it is determined that there is no more head frame to be processed, and the semantic analysis process of the analysis object frame NP8* ends (step 320—the process for determining a head frame to be processed).

According to FIG. 20, it is recognized that there is no modificative phrase, in FIG. 16, which modifies the head node NP8 of the analysis object NP2 (step 340—the modificative phrase frame extraction process). Since there is no modificative phrase frame set newly in step 340, it is determined that there is no more modificative phrase frame to be processed (step 350—the process for determining modificative phrase frame to be processed).

Since all head frames established in step 310 are processed, it is determined that there is no more head frame to be processed, and the semantic analysis process of the analysis object frame NP2* ends (step 320—the process for determining a head frame to be processed).

Since all the objective frames set newly in step 250 are processed, it is determined that there are no more deep case frames to be processed (step 260—the process for determining deep case frame to be processed).

Next, a deep case which has not been selected as an extraction object is selected as an extraction object among the deep cases in FIG. 22 which shows the semantic information of the head verb node V18. Then, the location case is determined as the extraction object. (step 240—the process for determining deep case to be extracted).

Then, surface case information (the surface case: accusative case of "at", the constraint condition: noun phrase in which the semantic information is occupation) is obtained by using a searching key (the deep case: location case, the voice: active voice, the precondition: none) according to the values shown in FIG. 22 (step 250—the deep case frame extraction process, step 251—the surface case information obtaining process).

It is recognized that the accusative case of "at" in the analysis object S1 is NP23 in FIG. 16 according to FIG. 20(D) (step 252—the syntactic tree node obtaining process 1). Since the constraint condition in the surface case information is "noun phrase in which the semantic information is a occupation", and NP23 is also the noun case in which the semantic information is occupation according to the information accompanying NP23, the result of the comparison is matching (step 253—the constraint condition comparing process 1).

Since the semantic frame corresponding to NP23 has not been established, the semantic frame NP23* is established and a location case relation link is set from V18* to NP23* (step 254—the deep case frame generation process 1).

The location case frame which will be processed is determined to be NP23* among the location case frames newly established in step 250 (step 260—the process for determining deep case frame to be processed). Then, the semantic analysis process is repeated recursively by inputting NP23* (step 270—deep case frame analysis process).

Since the subdivided type of the analysis object NP23 is general according to information accompanying the analysis object NP23, NP23 is determined to be a non-verb phrase class according to the classification knowledge of analysis object categories in FIG. 19 (step 100—the analysis object category determination process).

The head node of the analysis object NP23 is NP24 in FIG. 16 according to FIG. 20(H). Then, a semantic frame NP24* corresponding to NP24 is established, and a head relation link is set from NP23* to NP24*. (step 300—the non-verb phrase class analysis process, step 310—the head frame extraction process).

In the head frames obtained in the step 310, the head frame which will be processed is determined to be NP24* (step 320—the process for determining a head frame to be processed). Next, the semantic analysis process is repeated recursively by inputting NP24* (step 330—the head frame analysis process).

Since the subdivided type of the analysis object NP24 is general according to information accompanying the analysis object NP24, NP24 is determined to be a non-verb phrase class according to the classification knowledge of analysis object categories in FIG. 19 (step 100—the analysis object category determination process).

Since the head node of the analysis object NP24 is NP26 in FIG. 16 according to FIG. 20(H), a semantic frame NP26* corresponding to NP26 is established, and a head relation link is set from NP24* to NP26*. (step 300—the non-verb phrase class analysis process, step 310—the head frame extraction process).

In the head frames obtained in the step 310, the head frame which will be processed is determined to be NP26* (step 320—the process for determining a head frame to be processed). Next, the semantic analysis process is repeated recursively by inputting NP26* (step 330—the head frame analysis process).

Since the subdivided type of the analysis object NP26 is general according to information accompanying the analysis object NP26, NP26 is determined to be a non-verb phrase class according to the classification knowledge of analysis object categories in FIG. 19 (step 100—the analysis object category determination process).

Since the head node of the analysis object NP26 is N27 in FIG. 16 according to the knowledge of positions in a syntactic tree, a semantic frame N27* corresponding to N27 is established, and a head relation link is set from NP26* to N27*. (step 300—the non-verb phrase class analysis process, step 310—the head frame extraction process).

In the head frames obtained in the step 310, the head frame which will be processed is determined to be N27* (step 320—the process for determining a head frame to be processed). Next, the semantic analysis process is repeated recursively by inputting N27* (step 330—the head frame analysis process).

Since the analysis object N27 is part of speech according to information accompanying the analysis object N27, the semantic analysis of the analysis object frame N27* ends. (step 100—the analysis object category determination process).

According to the knowledge of position of syntactic tree, it is recognized that there is no modificative phrase which modifies the head node N27 of the analysis object NP26 in the syntactic tree in FIG. 16 (step 340—the modificative phrase frame extraction process). Therefore, since there is no modificative phrase frame set newly in step 340, it is determined that there is no modificative phrase frame which will be processed (step 350—the process for determining modificative phrase frame to be processed).

Since all head frames established in step 310 are processed, it is determined that there is no more head frame to be processed, and the semantic analysis process of the analysis object frame NP26* ends (step 320—the process for determining a head frame to be processed).

According to FIG. 20(I), the modificative phrase which modifies the head node NP26 of the analysis object NP24 is DET25 in FIG. 16. Since a semantic frame corresponding to DET25 has not been established, a semantic frame DET25* is established and a modificative relation link is set from NP26* to DET25* (step 340—the modificative phrase frame extraction process). Then, it is determined that the modificative phrase frame to be processed is DET25* among the modificative phrase frames set newly in step 340 (step 350—the process for determining modificative phrase frame to be processed). Then, the semantic analysis process is repeated recursively by inputting DET25* (step 360—the modificative phrase frame analysis process).

Since the analysis object DET25 is part of speech according to information accompanying the analysis object DET25, the semantic analysis of the analysis object frame DET25* ends. (step 100—the analysis object category determination process).

Since all modificative phrase frames which were newly set in step 340 are processed, it is determined that there is no modificative phrase frame to be processed (step 350—the process for determining modificative phrase frame to be processed).

Since all head frames established in step 310 are processed, it is determined that there is no more head frame to be processed, and the semantic analysis process of the analysis object frame NP24* ends (step 320—the process for determining a head frame to be processed).

The modificative phrases which modifies the head node NP24 of the analysis object NP23 are NP30 and NP34 in FIG. 16 according to FIG. 20(I). Then, since a semantic frame corresponding to NP34 is not established, the semantic frame NP30* is established, and a modificative relation link is set from NP24* to NP30*. In addition, since a semantic frame corresponding to NP34 is not established, the semantic frame NP34* is established, and a modificative relation link is set from NP24* to NP34*(step 340—the modificative phrase frame extraction process).

Then, it is determined that the modificative phrase frame to be processed is NP30* among the modificative phrase frames set newly in step 340 (step 350—the process for determining modificative phrase frame to be processed). Then, the semantic analysis process is repeated recursively by inputting NP30* (step 360—the modificative phrase frame analysis process).

Since the subdivided type of the analysis object NP30 is general according to information accompanying the analysis object NP30, NP30 is determined to be a non-verb phrase class according to the classification knowledge of analysis object categories in FIG. 19 (step 100—the analysis object category determination process).

Since the head node of the analysis object NP30 is N31 in FIG. 16 according to the knowledge of positions in a syntactic tree, a semantic frame N31* corresponding to N31 is established, and a head relation link is set from NP30* to N31*. (step 300—the non-verb phrase class analysis process, step 310—the head frame extraction process).

In the head frames obtained in the step 310, the head frame which will be processed is determined to be N31* (step 320—the process for determining a head frame to be processed). Next, the semantic analysis process is repeated recursively by inputting N31* (step 330—the head frame analysis process).

Since the analysis object N31 is part of speech according to information accompanying the analysis object N31, the semantic analysis of the analysis object N31* ends. (step 100—the analysis object category determination process).

According to the knowledge of position of syntactic tree, it is recognized that there is no modificative phrase which modifies the head node N31 of the analysis object NP30 in the syntactic tree in FIG. 16 (step 340—the modificative phrase frame extraction process). Therefore, since there is no modificative phrase frame set newly in step 340, it is determined that there is no modificative phrase frame which will be processed (step 350—the process for determining modificative phrase frame to be processed).

Since all head frames established in step 310 are processed, it is determined that there is no more head frame to be processed, and the semantic analysis process of the analysis object frame NP30* ends (step 320—the process for determining a head frame to be processed).

Next, it is determined that the modificative phrase frame to be processed is NP34* among the modificative phrase frames set newly in step 340 which have not been processed (step 350—the process for determining modificative phrase frame to be processed). Then, the semantic analysis process is repeated recursively by inputting NP34* (step 360—the modificative phrase frame analysis process).

Since the subdivided type of the analysis object NP34 is general according to information accompanying the analysis object NP34, NP34 is determined to be a non-verb phrase class according to the classification knowledge of analysis object categories in FIG. 19 (step 100—the analysis object category determination process).

Since the head node of the analysis object NP34 is N35 in FIG. 16 according to the knowledge of positions in a syntactic tree, a semantic frame N35* corresponding to N35 is established, and a head relation link is set from NP34* to N35*. (step 300—the non-verb phrase class analysis process, step 310—the head frame extraction process).

In the head frames obtained in the step 310, the head frame which will be processed is determined to be N35* (step 320—the process for determining a head frame to be processed). Next, the semantic analysis process is repeated recursively by inputting N35* (step 330—the head frame analysis process).

Since the analysis object N35 is part of speech according to information accompanying the analysis object N35, the semantic analysis of the analysis object frame N35* ends. (step 100—the analysis object category determination process).

According to the knowledge of position of syntactic tree, it is recognized that there is no modificative phrase which modifies the head node N35 of the analysis object NP34 in the syntactic tree in FIG. 16 (step 340—the modificative phrase frame extraction process). Therefore, since there is no modificative phrase frame set newly in step 340, it is determined that there is no more modificative phrase frame which will be processed (step 350—the process for determining modificative phrase frame to be processed).

Since all head frames established in step 310 are processed, it is determined that there is no more head frame to be processed, and the semantic analysis process of the analysis object frame NP34* ends (step 320—the process for determining a head frame to be processed).

Since all modificative phrase frames established newly in step 340 are processed, it is determined that there is no more modificative phrase frame to be processed (step 350—the process for determining modificative phrase frame to be processed).

Then, since all head frames set in step 310 are processed, it is determined that there is no more head frame to be processed and the semantic analysis process of the analysis object frame NP23* ends (step 320—the process for determining a head frame to be processed).

In addition, since all the location case frames set newly in step 250 are processed, it is determined that there are no more deep case frames to be processed (step 260—the process for determining deep case frame to be processed).

Next, a deep case which has not been selected as an extraction object is selected as an extraction object among the deep cases in FIG. 22 which shows the semantic information of the head verb node V18. Then, the agentive case is determined as the extraction object (step 240—the process for determining deep case to be extracted).

Then, surface case information (the surface case: nominative case, the constraint condition: noun phrase in which the semantic information is man) is obtained by using a searching key (the deep case: agentive case, the voice: active voice, the precondition: none) according to the values shown in FIG. 22 (step 250—the deep case frame extraction process, step 251—the surface case information obtaining process).

It is recognized that the nominative case int the analysis object S1 is NP14 in FIG. 14 according to FIG. 20(C) (step 252—the syntactic tree node obtaining process 1). Since the constraint condition in the surface case information is "noun phrase in which the semantic information is man", and NP14 is also the noun case in which the semantic information is man according to the information accompanying NP14, the result of the comparison is matching (step 253—the constraint condition comparing process 1).

Since the semantic frame corresponding to NP14 has not been established, the semantic frame NP14* is established and an agentive case relation link is set from V18* to NP14* (step 254—the deep case frame generation process 1).

The agentive case frame which will be processed is determined to be NP14* among the agentive case frames newly established in step 250 (step 260—the process for determining deep case frame to be processed). Then, the semantic analysis process is repeated recursively by inputting NP14* (step 270—deep case frame analysis process).

Since the subdivided type of the analysis object NP14 is pronoun according to information accompanying the analysis object NP14, NP14 is determined to be a non-verb phrase class according to the classification knowledge of analysis object categories in FIG. 19 (step 100—the analysis object category determination process).

The head node of the analysis object NP14 is PN15 in FIG. 16 according to the knowledge of positions in a syntactic tree. Then, a semantic frame PN15* corresponding to PN15 is established, and a head relation link is set from NP14* to PN15*. (step 300—the non-verb phrase class analysis process, step 310—the head frame extraction process).

In the head frames obtained in the step 310, the head frame which will be processed is determined to be PN15* (step 320—the process for determining a head frame to be processed). Next, the semantic analysis process is repeated recursively by inputting PN15* (step 330—the head frame analysis process).

Since the analysis object PN15 is part of speech according to information accompanying the analysis object PN15, the semantic analysis of the analysis object frame PN15* ends. (step 100—the analysis object category determination process).

According to the knowledge of position of syntactic tree, it is recognized that there is no modificative phrase which modifies the head node PN15 of the analysis object NP14 in the syntactic tree in FIG. 16 (step 340—the modificative phrase frame extraction process). Therefore, since there is no modificative phrase frame set newly in step 340, it is determined that there is no more modificative phrase frame which will be processed (step 350—the process for determining modificative phrase frame to be processed).

Since all head frames established in step 310 are processed, it is determined that there is no more head frame to be processed, and the semantic analysis process of the analysis object frame NP14* ends (step 320—the process for determining a head frame to be processed).

Then, since all the agentive case frames set newly in step 250 are processed, it is determined that there are no more deep case frames to be processed (step 260—the process for determining deep case frame to be processed).

At this time, since all deep cases which are indicated in FIG. 22 are processed, it is determined that there are no more deep cases to be extracted (step 240—the process for determining deep case to be extracted).

Next, an object to be processed is selected in the head verb frames obtained in the step 210 which have not been processed. Then, the head verb frame which will be processed is determined to be V20* (step 220—the process for determining a head verb frame to be processed)

The voice of the analysis object $S_1$ is determined to be the active voice according to the information accompanying an upper node VP17 of the head verb node V20 (step 230—the voice determination process).

The semantic meaning of V20 is shown in FIG. 22 according to the information accompanying the head verb node V20. According to the deep case shown in FIG. 22, the deep case to be extracted is determined as the objective case (step 240—the process for determining deep case to be extracted).

Then, surface case information (the surface case: accusative case, the constraint condition: noun phrase in which the semantic information is thing) is obtained by using a searching key (the deep case: accusative case, the voice: active voice, the precondition: none) according to the values shown in FIG. 22 (step 250—the deep case frame extraction process, step 251—the surface case information obtaining process).

It is recognized that the accusative case of the analysis object S1 does not exist in the syntactic tree shown in FIG. 16 according to FIG. 20(B) (step 252—the syntactic tree node obtaining process 1). Next, the moved surface case information (the surface case: moved accusative case, the constraint condition: noun phrase in which the semantic information is thing) is obtained by using a searching key (the deep case: objective case, the voice: active voice, the precondition: no accusative case node) according to FIG. 22 (step 255—the process for obtaining moved surface case information).

According to FIG. 21(A), the moved accusative case becomes NP2 in FIG. 16 (step 256—the syntactic tree node obtaining process 2). Since the constraint condition in the moved surface case information is "noun phrase in which the semantic information is a thing", and NP2 is also the noun case in which the semantic information is a thing according to the information accompanying NP2, the result of the comparison is matching (step 257—the constraint condition comparing process 2). Since the semantic frame NP2* corresponding to NP2 has been established, an objective case relation link is set from V20* to NP2* (step 258—the deep case frame generation process 2).

Then, since any objective case frame is not newly set in step 250, it is determined that there is no deep case frame to be processed (step 260—the process for determining deep case frame to be processed).

Next, a deep case which has not been selected as an extraction object is selected as an extraction object among deep cases in FIG. 22 which shows the semantic information of the head verb node V20. Then, the location case is determined as the extraction object. (step 240—the process for determining deep case to be extracted).

Then, surface case information (the surface case: accusative case of "at", the constraint condition: noun phrase in which the semantic information is occupation) is obtained by using a searching key (the deep case: location case, the voice: active voice, the precondition: none) according to the values shown in FIG. 22 (step 250—the deep case frame extraction process, step 251—the surface case information obtaining process).

It is recognized that the accusative case of "at" in the analysis object S1 is NP23 in FIG. 16 according to FIG. 20(D) (step 252—the syntactic tree node obtaining process 1). Since the constraint condition in the surface case information is "noun phrase in which the semantic information is a occupation", and NP23 is also the noun phrase in which the semantic information is occupation according to the information accompanying NP23, the result of the comparison is matching (step 253—the constraint condition comparing process 1).

Since the semantic frame NP23* corresponding to NP23 has been established, a location case relation link is set from V20* to NP23* (step 254—the deep case frame generation process 1).

Then, since any location case frame is not newly set in step 250, it is determined that there is no deep case frame to be processed (step 260—the process for determining deep case frame to be processed).

Next, a deep case which has not been selected as an extraction object is selected as an extraction object among deep cases in FIG. 22 which shows the semantic information of the head verb node V18. Then, the agentive case is determined as the extraction object. (step 240—the process for determining deep case to be extracted).

Then, surface case information (the surface case: nominative case, the constraint condition: noun phrase in which the semantic information is man) is obtained by using a searching key (the deep case: agentive case, the voice: active voice, the precondition: none) according to the values shown in FIG. 22 (step 250—the deep case frame extraction process, step 251—the surface case information obtaining process).

It is recognized that the nominative case in the analysis object S1 is NP14 in FIG. 10 according to FIG. 20(C) (step 252—the syntactic tree node obtaining process 1). Since the constraint condition in the surface case information is "noun phrase in which the semantic information is man", and NP14 is also the noun phrase in which the semantic information is man according to the information accompanying NP14, the result of the comparison is matching (step 253—the constraint condition comparing process 1).

Since the semantic frame NP14* corresponding to NP14 has been established, an agentive case relation link is set from V20* to NP14* (step 254—the deep case frame generation process 1).

Then, since there is no agentive case frame newly set in step 250, it is determined that there is no deep case frame to be processed (step 260—the process for determining deep case frame to be processed).

Thus, since all the deep cases shown in FIG. 22 which shows the semantic information of the head verb node V20 have been processed, it is determined that there are no more deep cases to be extracted. (step 240—the process for determining deep case to be extracted).

At this time, all the head verb frames set in step 210 are processed. Therefore, the semantic analysis process of the analysis object frame S1* ends (step 220—the process for determining a head verb frame to be processed).

According to the above mentioned processes, the semantic structure shown in FIG. 17 or FIG. 18 can be obtained as the output result when the syntactic tree shown in FIG. 16 is input.

The above-mentioned embodiment is described based on the composing elements of the semantic analysis apparatus. However, the present invention is not limited to the embodiment. For example, it is possible to construct each composing element of the semantic analysis apparatus in FIGS. 4–5 and the information searching apparatus in FIG. 3 by using a program which can be stored in a computer readable medium such as a disk unit, a floppy disk, CD-ROM and the like. The method of the present invention can be easily realized by installing the program to a computer system.

Figure 23:
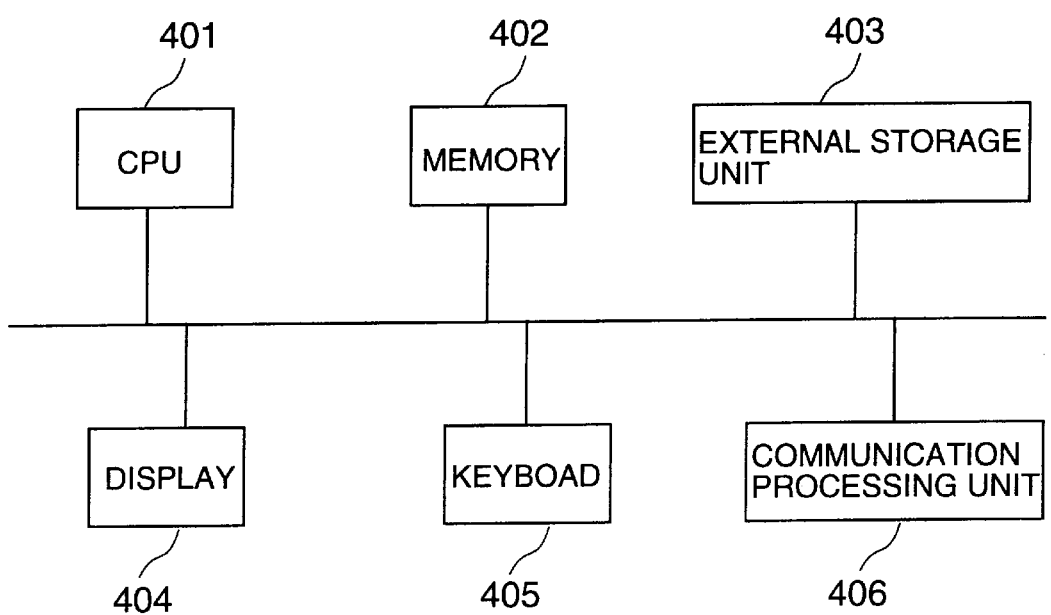
FIG. 23 is a block diagram of a computer system.

FIG. 23 is a block diagram of the computer system. The computer system comprises a CPU 401 for carrying out tasks, a memory 402 for storing programs and data, an external storage unit 403 for storing programs and data used by the memory 402 or the CPU 401, a display 404 for displaying data, a keyboard 405 used for inputting data or instructions, and a communication processing apparatus 406 for communicating with other computers through networks. The communication processing apparatus can be called an interface. The above-mentioned program runs on the CPU401.

As mentioned above, according to the present invention, the semantic analysis is carried out from the top down such that only necessary deep case phrases, beginning with a head of a sentence, which are specified for keyword extraction are analyzed. Therefore, the present invention can circumvent the need to analyze the inside of the deep case, which is unnecessary, such that the time necessary for the analysis can be reduced.

In addition, the semantic analysis apparatus according to the present invention has knowledge of position, for every kinds of phrases, of the head, the surface case of the head and the modificative phrase which modifies the head in the syntactic tree. Therefore, the semantic analysis apparatus allows the user to easily understand the flow of the semantic analysis in a visual way such that the user can easily maintain and modify the semantic analysis apparatus.

The present invention is not limited to the specifically disclosed embodiments, and variations and modifications may be made without departing from the scope of the invention.

What is claimed is:

1. A method for performing a semantic analysis process on a computer system including a storage unit and an interface, said method comprising the steps of:

receiving a syntactic tree generated from a natural language sentence text;

determining whether an, analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

analyzing a relation between a verb in said analysis object and a deep case of said verb when said analysis object is said verb phrase class;

analyzing a modificative relation in said analysis object when said analysis object is said non-verb phrase class;

generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and storing said semantic structure in said storage unit or displaying said semantic structure on a display which is connectable to said computer system via said interface;

wherein said step of analyzing a relation between a verb and a deep case of said verb comprises the steps of:

(a) setting a head verb frame corresponding to a head verb node which is the head of said analysis object, and linking an analysis object frame corresponding to said analysis object and said head verb frame by said head relation;

(b) determining the voice of said analysis object with reference to voice information accompanying a node including said analysis object;

(c) determining a deep case to be extracted from deep cases included in verb semantic information accompanying said head verb node; and (d) obtaining a syntactic tree node corresponding to said deep case determined in said step (c), setting a deep case frame corresponding to said syntactic tree node, and linking said head verb frame and said deep case frame by said deep case relation.

2. The method as claimed in claim 1, further comprising the steps of;

determining whether said analysis object is a part of speech, and completing said semantic analysis process if said analysis object is said part of speech.

3. A method for performing a semantic analysis process on a computer system including a storage unit and an interface, said method comprising the steps of:

receiving a syntactic tree generated from a natural language sentence text;

determining whether an, analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

analyzing a relation between a verb in said analysis object and a deep case of said verb when said analysis object is said verb phrase class;

analyzing a modificative relation in said analysis object when said analysis object is said non-verb phrase class;

generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and storing said semantic structure in said storage unit or displaying said semantic structure on a display which is connectable to said computer system via said interface;

wherein said step of analyzing a relation between a verb and a deep case of said verb comprises the steps of:

(a) obtaining a head verb node which is the head of said analysis object with reference to second data stored in said storage unit, setting a head verb frame corresponding to said head verb node, and linking an analysis object frame corresponding to said analysis object and said head verb frame by said head relation;

(b) determining the voice of said analysis object with reference to voice information accompanying a node including said analysis object;

(c) determining a deep case to be extracted from deep cases included in verb semantic information accompanying said head verb node;

(d) obtaining a syntactic tree node corresponding to said deep case determined in said step (c), setting a deep case frame corresponding to said syntactic tree node, and linking said head verb frame and said deep case frame by said deep case relation;

(e) performing said semantic analysis process for said deep case frame if said deep case frame is set in said step (d), and (f) performing said step (c) when said step (e) completes, and completing said semantic analysis process if there is no deep case to be extracted in said deep cases included in verb semantic information when performing said step (c).

4. The method as claimed in claim 3, wherein said step (d) comprises the steps of:

obtaining a surface case corresponding to said deep case determined in said step (c) with reference to said voice determined in said step (b) and verb semantic information accompanying said head verb node;

obtaining a syntactic tree node corresponding to said surface case with reference to said surface case and said second data stored in said storage unit;

comparing information with constraint condition knowledge of said deep case in said verb semantic information, said information including phrase type information, the subdivided type information and semantic information, said information accompanying said syntactic tree node, and setting a deep case frame corresponding to said syntactic tree node and linking said head verb frame and said deep case frame by said deep case relation if said information is the same as said constraint condition knowledge.

5. The method as claimed in claim 4, further comprising the steps of obtaining moved surface case information and generating a deep case frame if said surface case or said syntactic tree node can not be obtained or if there is not said syntactic tree node accompanied with said information which is the same as said constraint condition knowledge.

6. A method for performing a semantic analysis process on a computer system including a storage unit and an interface, said method comprising the steps of:

receiving a syntactic tree generated from a natural language sentence text;

determining whether an, analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

analyzing a relation between a verb in said analysis object and a deep case of said verb when said analysis object is said verb phrase class;

analyzing a modificative relation in said analysis object when said analysis object is said non-verb phrase class;

generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and storing said semantic structure in said storage unit or displaying said semantic structure on a display which is connectable to said computer system via said interface;

wherein said step of analyzing a relation between a verb and a deep case of said verb comprising the steps of:

(a) obtaining a head verb node which is the head of said analysis object with reference to second data stored in said storage unit, setting a head verb frame corresponding to said head verb node, and linking an analysis object frame corresponding to said analysis object and said head verb frame by said head relation;
- (b) determining a head verb frame to be processed from said head verb frames set in said step (a);
- (c) determining the voice of said analysis object with reference to voice information accompanying a node including said analysis object;
- (d) determining a deep case to be extracted from deep cases included in verb semantic information accompanying said head verb node;
- (e) obtaining a syntactic tree node corresponding to said deep case determined in said step (d), setting a deep case frame corresponding to said syntactic tree node, and linking said head verb frame and said deep case frame by said deep case relation;
- (f) determining a deep case frame to be processed from said deep case frames set in said step (e);
- (g) performing said semantic analysis process for said deep case frame determined in said step (f), and
- (h) performing said step (f) when said step (g) completes, performing said step (d) if there is no deep case frame to be processed in said deep case frames when performing said step (f), performing said step (b) if there is no deep case to be extracted in said deep cases included in verb semantic information when performing said step (d), and completing said semantic analysis process if there is no head verb frame to be processed in said head verb frames when performing said step (b).

7. A method for performing a semantic analysis process on a computer system including a storage unit and an interface, said method comprising the steps of:

receiving a syntactic tree generated from a natural language sentence text;

determining whether an, analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

analyzing a relation between a verb in said analysis object and a deep case of said verb when said analysis object is said verb phrase class;

analyzing a modificative relation in said analysis object when said analysis object is said non-verb phrase class;

generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and storing said semantic structure in said storage unit or displaying said semantic structure on a display which is connectable to said computer system via said interface;

wherein said step of analyzing a modificative relation comprises the steps of:

- (a) obtaining a head node which is the head of said analysis object with reference to second data stored in said storage unit, setting a head frame corresponding to said head node, and linking an analysis object frame corresponding to said analysis object and said head frame by said head relation;
- (b) performing said semantic analysis process for said head frame;
- (c) obtaining a modificative phrase node which modifies said head node with reference to said second data stored in said storage unit, setting a modificative phrase frame corresponding to said modificative phrase node, and linking said head frame and said modificative phrase frame by said modificative relation;
- (d) determining whether said modificative phrase frame is set when performing said step (c);
- (e) performing said semantic analysis process for said modificative phrase frame if said modificative phrase frame is determined to be set in said step (d), and
- (f) performing said step (c) when said step (e) completes, completing said semantic analysis process if said modificative phrase frame is not determined to be set in said step (d).

8. A method for performing a semantic analysis process on a computer system including a storage unit and an interface, said method comprising the steps of:

receiving a syntactic tree generated from a natural language sentence text;

determining whether an, analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

analyzing a relation between a verb in said analysis object and a deep case of said verb when said analysis object is said verb phrase class;

analyzing a modificative relation in said analysis object when said analysis object is said non-verb phrase class;

generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and storing said semantic structure in said storage unit or displaying said semantic structure on a display which is connectable to said computer system via said interface;

wherein said step of analyzing a modificative relation comprises the steps of:

- (a) obtaining a head node which is the head of said analysis object with reference to second data stored in said storage unit, setting a head frame corresponding to said head node, and linking an analysis object frame corresponding to said analysis object and said head frame by said head relation;
- (b) determining a head frame to be processed from said head frames set in said step (a);
- (c) performing said semantic analysis process for said head frame determined in said step (b);
- (d) obtaining a modificative phrase node which modifies said head node with reference to said second data stored in said storage unit, setting a modificative phrase frame corresponding to said modificative phrase node, and linking said head frame and said modificative phrase frame by said modificative relation;
- (e) determining a modificative phrase frame to be processed from said modificative phrase frames set in said step (d);
- (f) performing said semantic analysis process for said modificative phrase frame determined in said step (e), and (g) performing said step (e) when said step (f) completes, performing said step (b) if there is no modificative phrase frame to be processed in said modificative phrase frames when performing said step (e), and completing said semantic analysis process if there is no head frame to be processed in said head frames when performing said step (b).

9. A method for searching information which uses a method for performing a semantic analysis process on a computer system including a storage unit and an interface, said method including the steps of: receiving a syntactic tree generated from a natural language sentence text; determining whether an, analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit; analyzing a relation between a verb in said analysis object and a deep case of said verb when said analysis object is said verb phrase class; analyzing a modificative relation in said analysis object when said analysis object is said non-verb phrase class; generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and storing said semantic structure in said storage unit or displaying said semantic structure on a display which is connectable to said computer system via said interface, said method for searching information comprising the steps of:

receiving a natural language sentence text via said interface;

performing a morphological analysis process and a syntax analysis process of said natural language sentence text and generating a syntactic tree of said natural language sentence text;

performing said semantic analysis process for said syntactic tree and generating a semantic structure of said natural language sentence text;

extracting a keyword representing an intention of a user of said computer system from said semantic structure;

obtaining a category name and address information corresponding to said natural language sentence text from said keyword with reference to at least a knowledge database stored in said storage unit;

obtaining information to be searched with said category name and said address information with reference to an information database stored in said storage unit, said information database including said information which is classified by said category name and said address information, and sending obtained information via said interface to another computer system or displaying said information on a display which is connectable to said computer system.

10. An apparatus for performing a semantic analysis process, said apparatus including a storage unit and an interface, said apparatus comprising:

means for receiving a syntactic tree generated from a natural language sentence text;

first means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

second means for analyzing a relation between a verb in said analysis object and a deep case of said verb when said analysis object is said verb phrase class;

third means for analyzing a modificative relation in said analysis object when said analysis object is said non-verb phrase class;

means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and wherein said semantic structure is stored in said storage unit or displayed on a display which is connectable to said apparatus via said interface;

wherein said second means for analyzing a relation between a verb and a deep case of said verb comprises:

fourth means for setting a head verb frame corresponding to a head verb node which is the head of said analysis object, and linking an analysis object frame corresponding to said analysis object and said head verb frame by said head relation;

fifth means for determining the voice of said analysis object with reference to voice information accompanying a node including said analysis object;

sixth means for determining a deep case to be extracted from deep cases included in verb semantic information accompanying said head verb node; and seventh means for obtaining a syntactic tree node corresponding to said deep case determined in said sixth means, setting a deep case frame corresponding to said syntactic tree node, and linking said head verb frame and said deep case frame by said deep case relation.

11. The apparatus as claimed in claim 10, further comprising;

means for determining whether said analysis object is a part of speech, and means for completing said semantic analysis process if said analysis object is said part of speech.

12. An apparatus for performing a semantic analysis process, said apparatus including a storage unit and an interface, said apparatus comprising:

means for receiving a syntactic tree generated from a natural language sentence text;

first means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

second means for analyzing a relation between a verb in said analysis object and a deep case of said verb when said analysis object is said verb phrase class;

third means for analyzing a modificative relation in said analysis object when said analysis object is said non-verb phrase class;

means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and wherein said semantic structure is stored in said storage unit or displayed on a display which is connectable to said apparatus via said interface;

wherein said second means for analyzing a relation between a verb and a deep case of said verb comprises:

fourth means for obtaining a head verb node which is the head of said analysis object with reference to second data stored in said storage unit, setting a head verb frame corresponding to said head verb node, and linking an analysis object frame corresponding to said analysis object and said head verb frame by said head relation;

fifth means for determining the voice of said analysis object with reference to voice information accompanying a node including said analysis object;

sixth means for determining a deep case to be extracted from deep cases included in verb semantic information accompanying said head verb node;

seventh means for obtaining a syntactic tree node corresponding to said deep case determined in said sixth means, setting a deep case frame corresponding to said syntactic tree node, and linking said head verb frame and said deep case frame by said deep case relation;

eighth means for performing said semantic analysis process for said deep case frame if said deep case frame is set in said seventh means, and ninth means for performing the process of said sixth means when the process of said eighth means completes, and completing said semantic analysis process if there is no deep case to be extracted in said deep cases included in verb semantic information in said sixth means.

13. The apparatus as claimed in claim 12, wherein said seventh means comprises:

means for obtaining a surface case corresponding to said deep case determined in said sixth means with reference to said voice determined in said fifth means and verb semantic information accompanying said head verb node;

means for obtaining a syntactic tree node corresponding to said surface case with reference to said surface case and said second data stored in said storage unit;

means for comparing information with constraint condition knowledge of said deep case in said verb semantic information, said information including phrase type information, the subdivided type information and semantic information, said information accompanying said syntactic tree node, and means for setting a deep case frame corresponding to said syntactic tree node and linking said head verb frame and said deep case frame by said deep case relation if said information is the same as said constraint condition knowledge.

14. The apparatus as claimed in claim 13, further comprising means for obtaining moved surface case information and generating a deep case frame if said surface case or said syntactic tree node can not be obtained or if there is not said syntactic tree node accompanied with said information which is the same as said constraint condition knowledge.

15. An apparatus for performing a semantic analysis process, said apparatus including a storage unit and an interface, said apparatus comprising:

means for receiving a syntactic tree generated from a natural language sentence text;

first means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

second means for analyzing a relation between a verb in said analysis object and a deep case of said verb when said analysis object is said verb phrase class;

third means for analyzing a modificative relation in said analysis object when said analysis object is said non-verb phrase class;

means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and wherein said semantic structure is stored in said storage unit or displayed on a display which is connectable to said apparatus via said interface;

wherein said second means of analyzing a relation between a verb and a deep case of said verb comprising the steps of:

fourth means for obtaining a head verb node which is the head of said analysis object with reference to second data stored in said storage unit, setting a head verb frame corresponding to said head verb node, and linking an analysis object frame corresponding to said analysis object and said head verb frame by said head relation;

fifth means for determining a head verb frame to be processed from said head verb frames set in said fourth means;

sixth means for determining the voice of said analysis object with reference to voice information accompanying a node including said analysis object;

seventh means for determining a deep case to be extracted from deep cases included in verb semantic information accompanying said head verb node;

eighth means for obtaining a syntactic tree node corresponding to said deep case determined in said seventh means, setting a deep case frame corresponding to said syntactic tree node, and linking said head verb frame and said deep case frame by said deep case relation;

ninth means for determining a deep case frame to be processed from said deep case frames set in said eighth means;

tenth means for performing said semantic analysis process for said deep case frame determined in said ninth means, and eleventh means for performing the process of said ninth means when the process of said tenth means completes, performing the process of said seventh means if there is no deep case frame to be processed in said deep case frames in said ninth means, performing the process of said fifth means if there is no deep case to be extracted in said deep cases included in verb semantic information in said seventh means, and completing said semantic analysis process if there is no head verb frame to be processed in said head verb frames in said fifth means.

16. An apparatus for performing a semantic analysis process, said apparatus including a storage unit and an interface, said apparatus comprising:

means for receiving a syntactic tree generated from a natural language sentence text;

first means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

second means for analyzing a relation between a verb in said analysis object and a deep case of said verb when said analysis object is said verb phrase class;

third means for analyzing a modificative relation in said analysis object when said analysis object is said non-verb phrase class;

means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and wherein said semantic structure is stored in said storage unit or displayed on a display which is connectable to said apparatus via said interface;

wherein said third means for analyzing a modificative relation comprises:

fourth means for obtaining a head node which is the head of said analysis object with reference to second data stored in said storage unit, setting a head frame corresponding to said head node, and linking an analysis object frame corresponding to said analysis object and said head frame by said head relation;

fifth means for performing said semantic analysis process for said head frame;

sixth means for obtaining a modificative phrase node which modifies said head node with reference to said second data stored in said storage unit, setting a modificative phrase frame corresponding to said modificative phrase node, and linking said head frame and said modificative phrase frame by said modificative relation;

seventh means for determining whether said modificative phrase frame is set when performing the process of said sixth means;

eighth means for performing said semantic analysis process for said modificative phrase frame if said modificative phrase frame is determined to be set in said seventh means, and ninth means for performing the process of said sixth means when the process of said eighth means completes, completing said semantic analysis process if said modificative phrase frame is not determined to be set in said seventh means.

17. An apparatus for performing a semantic analysis process, said apparatus including a storage unit and an interface, said apparatus comprising:

means for receiving a syntactic tree generated from a natural language sentence text;

first means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

second means for analyzing a relation between a verb in said analysis object and a deep case of said verb when said analysis object is said verb phrase class;

third means for analyzing a modificative relation in said analysis object when said analysis object is said non-verb phrase class;

means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and wherein said semantic structure is stored in said storage unit or displayed on a display which is connectable to said apparatus via said interface;

wherein said third means for analyzing a modificative relation comprises:

fourth means for obtaining a head node which is the head of said analysis object with reference to second data stored in said storage unit, setting a head frame corresponding to said head node, and linking an analysis object frame corresponding to said analysis object and said head frame by said head relation;

fifth means for determining a head frame to be processed from said head frames set in said fourth means;

sixth means for performing said semantic analysis process for said head frame determined in said fifth means;

seventh means for obtaining a modificative phrase node which modifies said head node with reference to said second data stored in said storage unit, setting a modificative phrase frame corresponding to said modificative phrase node, and linking said head frame and said modificative phrase frame by said modificative relation;

eighth means for determining a modificative phrase frame to be processed from said modificative phrase frames set in said seventh means;

ninth means for performing said semantic analysis process for said modificative phrase frame determined in said eighth means, and tenth means for performing the process of said eighth means when the process of said ninth means completes, performing the process of said fifth means if there is no modificative phrase frame to be processed in said modificative phrase frames when performing the process of said eighth means, and completing said semantic analysis process if there is no head frame to be processed in said head frames when performing the process of said fifth means.

18. An apparatus for searching information which uses an apparatus for performing a semantic analysis process, said apparatus including a storage unit and an interface, said apparatus including: means for receiving a syntactic tree generated from a natural language sentence text; first means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit; second means for analyzing a relation between a verb in said analysis object and a deep case of said verb when said analysis object is said verb phrase class; third means for analyzing a modificative relation in said analysis object when said analysis object is said non-verb phrase class; means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and wherein said semantic structure is stored in said storage unit or displayed on a display which is connectable to said apparatus via said interface, said apparatus for searching information comprising:
- means for receiving a natural language sentence text via said interface,
- means for performing a morphological analysis process and a syntax analysis process for said natural language sentence text and generating a syntactic tree of said natural language sentence text;
- means for performing said semantic analysis process for said syntactic tree and generating a semantic structure of said natural language sentence text;
- means for extracting a keyword representing an intention of a user of said apparatus from said semantic structure;
- means for obtaining a category name and address information corresponding to said natural language sentence text by using said keyword with reference to at least one knowledge database stored in said storage unit;
- means for obtaining information to be searched by using said category name and said address information with reference to an information database stored in said storage unit, said information database including said information which is classified by said category name and said address information, and
- means for sending obtained information via said interface to another computer system or displaying said information on said display which is connectable to said apparatus.

19. A computer readable medium storing program code for causing a computer system which includes a storage unit and an interface to perform a semantic analysis process, said computer readable medium comprising:
- program code means for receiving a syntactic tree generated from a natural language sentence text;
- first program code means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;
- second program code means for analyzing a relation between a verb in said analysis object and a deep case of said verb when said analysis object is said verb phrase class;
- third program code means for analyzing a modificative relation in said analysis object when said analysis object is said non-verb phrase class;
- program code means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and
- program code means for storing said semantic structure in said storage unit or displaying said semantic structure on a display which is connectable to said computer system via said interface;
- wherein said second program code means for analyzing a relation between a verb and a deep case of said verb comprises:
- fourth program code means for setting a head verb frame corresponding to a head verb node which is the head of said analysis object, and linking an analysis object frame corresponding to said analysis object and said head verb frame be said head relation;
- fifth program code means for determining the voice of said analysis object with reference to voice information accompanying a node including said analysis object;
- sixth program code means for determining a deep case to be extracted from deep cases included in verb semantic information accompanying said head verb node; and
- seventh program code means for obtaining a syntactic tree node corresponding to said deep case determined in said sixth program code means, setting a deep case frame corresponding to said syntactic tree node, and linking said head verb frame and said deep case frame by said deep case relation.

20. The computer readable medium as claimed in claim 19, further comprising;
- program code means for determining whether said analysis object is a part of speech, and
- program code means for completing said semantic analysis process if said analysis object is said part of speech.

21. A computer readable medium storing program code for causing a computer system which includes a storage unit and an interface to perform a semantic analysis process, said computer readable medium comprising:
- program code means for receiving a syntactic tree generated from a natural language sentence text;
- first program code means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;
- second program code means for analyzing a relation between a verb in said analysis object and a deep case of said verb when said analysis object is said verb phrase class;
- third program code means for analyzing a modificative relation in said analysis object when said analysis object is said non-verb phrase class;
- program code means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and
- program code means for storing said semantic structure in said storage unit or displaying said semantic structure on a display which is connectable to said computer system via said interface;
- wherein said second program code means for analyzing a relation between a verb and a deep case of said verb comprises:
- fourth program code means for obtaining a head verb node which is the head of said analysis object with reference to second data stored in said storage unit, setting a head verb frame corresponding to said head verb node, and linking an analysis object frame corresponding to said analysis object and said head verb frame by said head relation;
- fifth program code means for determining the voice of said analysis object with reference to voice information accompanying a node including said analysis object;
- sixth program code means for determining a deep case to be extracted from deep cases included in verb semantic information accompanying said head verb node;

seventh program code means for obtaining a syntactic tree node corresponding to said deep case determined in said sixth program code means, setting a deep case frame corresponding to said syntactic tree node, and linking said head verb frame and said deep case frame by said deep case relation;

eighth program code means for performing said semantic analysis process for said deep case frame if said deep case frame is set in said seventh program code means, and ninth program code means for performing the process of said sixth program code means when the process of said eighth program code means completes, and completing said semantic analysis process if there is no deep case to be extracted in said deep cases included in verb semantic information in said sixth program code means.

22. The computer readable medium as claimed in claim 21, wherein said seventh program code means comprises:

program code means for obtaining a surface case corresponding to said deep case determined in said sixth program code means with reference to said voice determined in said fifth program code means and verb semantic information accompanying said head verb node;

program code means for obtaining a syntactic tree node corresponding to said surface case with reference to said surface case and said second data stored in said storage unit;

program code means for comparing information with constraint condition knowledge of said deep case in said verb semantic information, said information including phrase type information, the subdivided type information and semantic information, said information accompanying said syntactic tree node, and program code means for setting a deep case frame corresponding to said syntactic tree node and linking said head verb frame and said deep case frame by said deep case relation if said information is the same as said constraint condition knowledge.

23. The computer readable medium as claimed in claim 22, further comprising program code means for obtaining moved surface case information and generating a deep case frame if said surface case or said syntactic tree node can not be obtained or if there is not said syntactic tree node accompanied with said information which is the same as said constraint condition knowledge.

24. A computer readable medium storing program code for causing a computer system which includes a storage unit and an interface to perform a semantic analysis process, said computer readable medium comprising:

program code means for receiving a syntactic tree generated from a natural language sentence text;

first program code means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

second program code means for analyzing a relation between a verb in said analysis object and a deep case of said verb when said analysis object is said verb phrase class;

third program code means for analyzing a modificative relation in said analysis object when said analysis object is said non-verb phrase class;

program code means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and program code means for storing said semantic structure in said storage unit or displaying said semantic structure on a display which is connectable to said computer system via said interface;

wherein said second program code means for analyzing a relation between a verb and a deep case of said verb comprises:

fourth program code means for obtaining a head verb node which is the head of said analysis object with reference to second data stored in said storage unit, setting a head verb frame corresponding to said head verb node, and linking an analysis object frame corresponding to said analysis object and said head verb frame by said head relation;

fifth program code means for determining a head verb frame to be processed from said head verb frames set in said fourth program code means;

sixth program code means for determining the voice of said analysis object with reference to voice information accompanying a node including said analysis object;

seventh program code means for determining a deep case to be extracted from deep cases included in verb semantic information accompanying said head verb node;

eighth program code means for obtaining a syntactic tree node corresponding to said deep case determined in said seventh program code means, setting a deep case frame corresponding to said syntactic tree node, and linking said head verb frame and said deep case frame by said deep case relation;

ninth program code means for determining a deep case frame to be processed from said deep case frames set in said eighth program code means;

tenth program code means for performing said semantic analysis process for said deep case frame determined in said ninth program code means, and eleventh program code means for performing the process of said ninth program code means when the process of said tenth program code means completes, performing the process of said seventh program code means if there is no deep case frame to be processed in said deep case frames in said ninth program code means, performing the process of said fifth program code means if there is no deep case to be extracted in said deep cases included in verb semantic information in said seventh program code means, and completing said semantic analysis process if there is no head verb frame to be processed in said head verb frames in said fifth program code means.

25. A computer readable medium storing program code for causing a computer system which includes a storage unit and an interface to perform a semantic analysis process, said computer readable medium comprising:

program code means for receiving a syntactic tree generated from a natural language sentence text;

first program code means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

second program code means for analyzing a relation between a verb in said analysis object and a deep case of said verb when said analysis object is said verb phrase class;

third program code means for analyzing a modificative relation in said analysis object when said analysis object is said non-verb phrase class;

program code means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and program code means for storing said semantic structure in said storage unit or displaying said semantic structure on a display which is connectable to said computer system via said interface;

wherein said third program code means for analyzing a modificative relation comprises:

fourth program code means for obtaining a head node which is the head of said analysis object with reference to second data stored in said storage unit, setting a head frame corresponding to said head node, and linking an analysis object frame corresponding to said analysis object and said head frame by said head relation;

fifth program code means for performing said semantic analysis process for said head frame;

sixth program code means for obtaining a modificative phrase node which modifies said head node with reference to said second data stored in said storage unit, setting a modificative phrase frame corresponding to said modificative phrase node, and linking said head frame and said modificative phrase frame by said modificative relation;

seventh program code means for determining whether said modificative phrase frame is set when performing the process of said sixth program code means;

eighth program code means for performing said semantic analysis process for said modificative phrase frame if said modificative phrase frame is determined to be set in said seventh program code means, and ninth program code means for performing the process of said sixth program code means when the process of said eighth program code means completes, completing said semantic analysis process if said modificative phrase frame is not determined to be set in said seventh program code means.

26. A computer readable medium storing program code for causing a computer system which includes a storage unit and an interface to perform a semantic analysis process, said computer readable medium comprising:

program code means for receiving a syntactic tree generated from a natural language sentence text;

first program code means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit;

second program code means for analyzing a relation between a verb in said analysis object and a deep case of said verb when said analysis object is said verb phrase class;

third program code means for analyzing a modificative relation in said analysis object when said analysis object is said non-verb phrase class;

program code means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and program code means for storing said semantic structure in said storage unit or displaying said semantic structure on a display which is connectable to said computer system via said interface;

wherein said third program code means for analyzing a modificative relation comprises:

fourth program code means for obtaining a head node which is the head of said analysis object with reference to second data stored in said storage unit, setting a head frame corresponding to said head node, and linking an analysis object frame corresponding to said analysis object and said head frame by said head relation;

fifth program code means for determining a head frame to be processed from said head frames set in said fourth program code means;

sixth program code means for performing said semantic analysis process for said head frame determined in said fifth program code means;

seventh program code means for obtaining a modificative phrase node which modifies said head node with reference to said second data stored in said storage unit, setting a modificative phrase frame corresponding to said modificative phrase node, and linking said head frame and said modificative phrase frame by said modificative relation;

eighth program code means for determining a modificative phrase frame to be processed from said modificative phrase frames set in said seventh program code means;

ninth program code means for performing said semantic analysis process for said modificative phrase frame determined in said eighth program code means, and tenth program code means for performing the process of said eighth program code means when the process of said ninth program code means completes, performing the process of said fifth program code means if there is no modificative phrase frame to be processed in said modificative phrase frames when performing the process of said eighth program code means, and completing said semantic analysis process if there is no head frame to be processed in said head frames when performing the process of said fifth program code means.

27. A computer readable medium which includes a computer readable medium storing program code for causing a computer system which includes a storage unit and an interface to perform a semantic analysis process, said computer readable medium including: program code means for receiving a syntactic tree generated from a natural language sentence text; first program code means for determining whether an analysis object, which is one of nodes of said syntactic tree, is a verb phrase class which has a verb as a head or a non-verb phrase class which has mainly a noun as the head on the basis of subdivided type information of a phrase of said node with reference to first data stored in said storage unit; second program code means for analyzing a relation between a verb in said analysis object and a deep case of said verb when said analysis object is said verb phrase class; third program code means for analyzing a modificative relation in said analysis object when said analysis object is said non-verb phrase class; program code means for generating a semantic structure of said natural language sentence text wherein said semantic structure comprises semantic frames corresponding to nodes of said syntactic tree, at least two semantic frames of said semantic frames being linked by a head relation or a deep case relation or a modificative relation; and program code means for storing said semantic structure in said storage unit or displaying said semantic structure on a display which is connectable to said computer system via said interface, said computer readable medium comprising:

program code means for receiving a natural language sentence text via said interface, program code means for performing a morphological analysis process and a syntax analysis process for said natural language sentence text and generating a syntactic tree of said natural language sentence text;

program code means for performing said semantic analysis process for said syntactic tree and generating a semantic structure of said natural language sentence text;

program code means for extracting a keyword representing an intention of a user of said computer system from said semantic structure;

program code means for obtaining a category name and address information corresponding to said natural language sentence text by using said keyword with reference to at least one knowledge database stored in said storage unit;

program code means for obtaining information to be searched by using said category name and said address information with reference to an information database stored in said storage unit, said information database including said information which is classified by said category name and said address information, and program code means for sending obtained information via said interface to another computer system or displaying said information on a display which is connectable to said computer system.

* * * * *